US010989736B1

(12) United States Patent
Brown et al.

(10) Patent No.: US 10,989,736 B1
(45) Date of Patent: Apr. 27, 2021

(54) CANTILEVER-FREE SCANNING PROBE MICROSCOPY

(71) Applicant: Trustees of Boston University, Boston, MA (US)

(72) Inventors: Keith Andrew Brown, Newton, MA (US); Wenhan Cao, Shanghai (CN); Nourin Alsharif, Brighton, MA (US)

(73) Assignee: TRUSTEES OF BOSTON UNIVERSITY, Boston, MA (US)

( * ) Notice: Subject to any disclaimer, the term of this patent is extended or adjusted under 35 U.S.C. 154(b) by 0 days.

(21) Appl. No.: 17/081,771

(22) Filed: Oct. 27, 2020

Related U.S. Application Data

(60) Provisional application No. 62/926,782, filed on Oct. 28, 2019.

(51) Int. Cl.
*G01Q 60/38* (2010.01)
*G01Q 30/04* (2010.01)

(52) U.S. Cl.
CPC .............. *G01Q 60/38* (2013.01); *G01Q 30/04* (2013.01)

(58) Field of Classification Search
CPC ........ G01Q 60/38; G01Q 30/04; G01Q 30/06; G01Q 60/40; G01Q 60/42; G01Q 70/06
USPC ..... 850/8, 10, 11, 33, 40, 41, 42, 52, 53, 55
See application file for complete search history.

(56) References Cited

U.S. PATENT DOCUMENTS

| | | | |
|---|---|---|---|
| 5,866,021 A * | 2/1999 | Yagi | B82Y 35/00 216/84 |
| 6,479,817 B1 | 11/2002 | Yedur | |
| 8,595,859 B1 | 11/2013 | Rankl | |
| 8,910,311 B2 | 12/2014 | Humphris | |
| 2004/0087033 A1* | 5/2004 | Schembri | B01L 3/505 506/39 |
| 2005/0009101 A1* | 1/2005 | Blackburn | B01L 7/52 435/7.1 |
| 2005/0081609 A1 | 4/2005 | Worledge | |
| 2012/0279287 A1 | 11/2012 | Andry | |
| 2014/0130213 A1 | 5/2014 | Gellineau | |
| 2015/0309073 A1 | 10/2015 | Mirkin | |
| 2018/0193879 A1* | 7/2018 | Morita | H01L 41/37 |

OTHER PUBLICATIONS

Binnig, G. et al., "Atomic force microscope." Phys. Rev. Lett 56, p. 930 (1986).

Rabe, U. et al., "Vibrations of free and surface-coupled atomic force microscope cantilevers: Theory and experiment," Rev. Sci. Instrum. 67, pp. 3281-3293 (1996).

(Continued)

*Primary Examiner* — Nicole M Ippolito
(74) *Attorney, Agent, or Firm* — Nixon Peabody LLP

(57) ABSTRACT

A system includes a probe assembly, a camera, and a control system. The probe assembly includes a rigid substrate, a compliant layer provided on the rigid substrate, one or more rigid probes can be arranged on the compliant layer to cover at least a portion of the compliant layer, and a reflective layer can cover the one or more rigid probes and uncovered portions of the compliant layer. The camera is configured to generate image data from the probe assembly. The control system is configured to receive image data from the camera and develop a topographical image of a surface of a sample, based at least in part on the received image data.

30 Claims, 19 Drawing Sheets

(56) References Cited

OTHER PUBLICATIONS

Minne, S.C. et al., "Automated parallel high-speed atomic force microscopy," Appl. Phys. Lett. 72, pp. 2340-2342 (1998).
Piner, R. D. et al., "'Dip-pen' nanolithography," Science 283, pp. 661-663 (1999).
Vettiger, P. et al., "The 'Millipede'—More than thousand tips for future AFM storage," IBM J. Res. Dev, 44, pp. 323-340 (2000).
Turner, J.A. & Wiehn, J.S., "Sensitivity of flexural and torsional vibration modes of atomic force microscope cantilevers to surface stiffness variations," Nanotechnology 12, pp. 322330 (2001).
Giessibl, F.J., "Advances in atomic force microscopy," Rev. Mod. Phys. 75, pp. 949-983 (2003).
Kramer, S. et al., "Scanning probe lithography using self-assembled monolayers," Chem. Rev. 103, pp. 4367-4418 (2003).
Geissler, M. & Xia, Y., "Patterning: Principles and some new developments," Adv. Mater. 16, pp. 1249-1269 (2004).
Huang, L. & Su, C., "A torsional resonance mode AFM for in-plane top surface interactions," Ultramicroscopy 100, pp. 277-285 (2004).
Gates, B.D. et al., "New approaches to nanofabrication: Molding, printing, and other techniques," Chem. Rev. 105, pp. 1171-1196 (2005).
Cannara, R.J. et al., "Lateral force calibration in atomic force microscopy: a new lateral force calibration method and general guidelines for optimization," Rev. Sci. Instrum. 77, 053701 (2006).
Li, S. et al., "Pneumatically actuated elastomeric device for nanoscale surface patterning," Appl. Phys. Lett. 91 (2007).
Huo, F. et al., "Polymer pen lithography," Science 321, pp. 1658-1660 (2008).
Nie, Z. & Kumacheva, E., "Patterning surfaces with functional polymers," Nat. Mater. 7, pp. 277-290 (2008).
Masubuchi, S. et al., "Fabrication of graphene nanoribbon by local anodic oxidation lithography using atomic force microscope," Appl. Phys. Lett. 94, pp. 2-5 (2009).
Huo, F. et al., "Beam pen lithography," Nat. Nanotechnol. 5, pp. 637-640 (2010).
Saavedra, H.M. et al., "Hybrid strategies in nanolithography," Reports Prog. Phys. 73, 036501 (2010).
Giam, L.R. & Mirkin, C.A., "Cantilever-free scanning probe molecular printing," Agnew Chemie—Int. Ed. 50, pp. 7482-7485 (2011).
Shim, W. et al., "Hard-tip, soft-spring lithography," Nature 469, pp. 516-521 (2011).
Tseng, A.A., "Advancements and challenges in development of atomic force microscopy for nanofabrication," Nano Today 6, pp. 493-509 (2011).
Bonnell, D.A. et al., "Imaging physical phenomena with local probes: From electrons to photons," Rev. Mod. Phys. 84, pp. 1343-1381 (2012).

Xie, Z. et al., "Polymer pen lithography using dual-elastomer tip arrays," Small 8, pp. 26642669 (2012).
Ando, T. et al., "High-speed AFM and applications to biomolecular systems," Annu. Rev. Biophys. 42, pp. 393-414 (2013).
Brown, K.A. et al., "A cantilever-free approach to dot-matrix nanoprinting," Proc. Natl. Acad. Sci. U.S.A. 110, pp. 12921-12924 (2013).
Eichelsdoerfer, D.J. et al., "Tuning the spring constant of cantilever-free tip arrays," Nano Lett. 13, pp. 664-667 (2013).
Eichelsdoerfer, D.J. et al., "Large-area molecular patterning with polymer pen lithography," Nat. Protoc. 8, pp. 2548-2560 (2013).
Liao, X. et al., "Desktop nanofabrication with massively multiplexed beam pen lithography," Nat. Commun. 4, pp. 1-7 (2013).
Vandat, V. & Carpick, R.W., "Practical method to limit tip-sample contact stress and prevent wear in amplitude modulation atomic force microscopy," ACS Nano 7, pp. 98369850 (2013).
Garcia, R. et al., "Advanced scanning probe lithography," Nat. Nanotechnol. 9, pp. 577-587 (2014).
Seong, M. et al., "Parallel nanoimaging using an array of 30 heated microcantilevers," RSC Adv. 4, pp. 24747-24754 (2014).
Somnath, S et al., "Parallel nanoimaging and nanolithography using a heated microcantilever array," Nanotechnology 25, p. 14001 (2014).
Weymouth, A.J., "Quantifying molecular stiffness and interaction with lateral force microscopy," Science 343, pp. 1120-1122 (2014).
He, Q. et al., "Recent advances in cantilever-free scanning probe lithography: high-throughput, space-confined synthesis of nanostructures and beyond," ACS Nano 11, pp. 4381-4386 (2017).
Isaacoff, B.P. & Brown, K.A., "Progress in top-down control of bottom-up assembly," Nano Lett. 17, pp. 6508-6510 (2017).
Alsharif, N. et al., "Design and Realization of 3D Printed AFM Probes," Small 14, pp. 1-6.
Huang, Z. et al., "Photoactuated pens for molecular printing," Adv. Mater. 30, 1705303 (2018).
Li, L. et al., "Confinement-Induced Stiffening of Elastomer Thin Films," J. Phys. Chem. B 122, pp. 10767-10773 (2018).
Nievergelt, A.P. et al., "High-speed photothermal off-resonance atomic force microscopy reveals assembly routes of centriolar scaffold protein SAS-6," Nat. Nanotechnol. 13, pp. 696-701 (2018).
Kizu, R. et al., "Accurate vertical sidewall measurement by a metrological tilting-AFM for reference metrology of line edge roughness," Metrology, Inspection, and Process Control for Microlithography XXXIII, 109592B (2019).
Kluender, E.J. et al., "Catalyst discovery through megalibraries of nanomaterials," Proc. Natl. Acad. Sci. U. S. A. 116, pp. 40-45 (2019).
Liu, G. et al., "Development of dip-pen nanolithography (DPN) and its derivatives," Small 15, 1900564 (2019).
International Search Report and Written Opinion of International Searching Authority for Application No. PCT/US2020/057510, dated Feb. 26, 2021 (11 pages).

\* cited by examiner

60 μm Scale

3 μm Scale

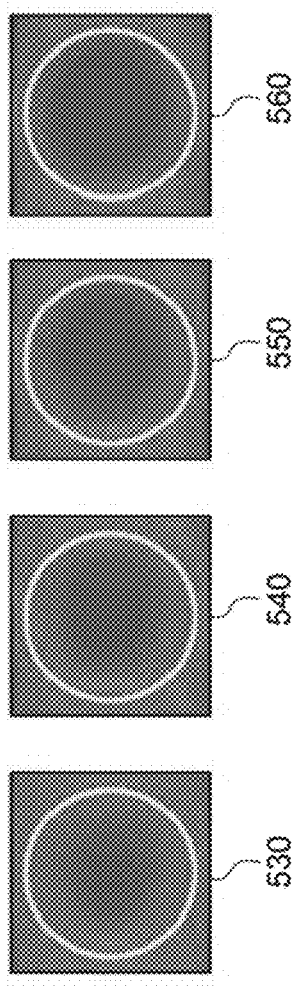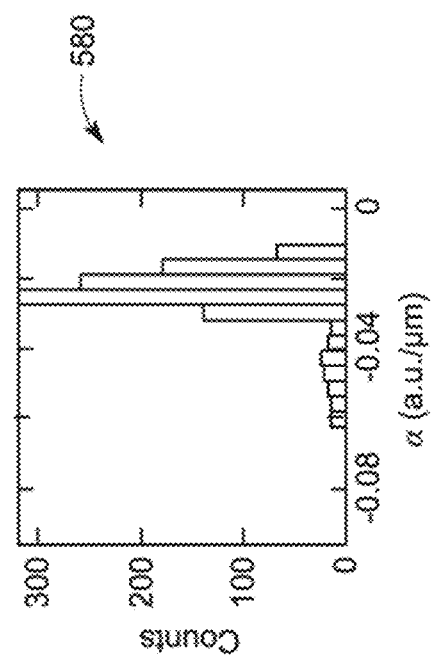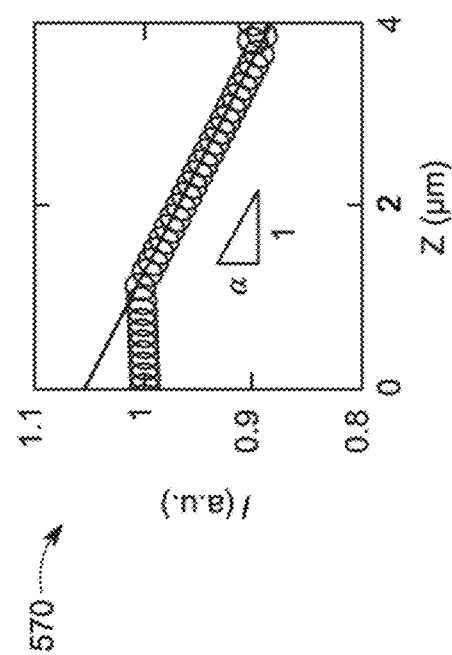
FIG. 5C
FIG. 5D
FIG. 5E

CANTILEVER-FREE SCANNING PROBE MICROSCOPY

CROSS-REFERENCE TO RELATED APPLICATIONS

This application claims priority to and the benefits of U.S. Provisional Patent Application No. 62/926,782, filed Oct. 28, 2019, the contents of which is hereby incorporated by reference herein in its entirety.

STATEMENT REGARDING FEDERALLY SPONSORED RESEARCH

This invention was made with government support under Multidisciplinary University Research Initiatives FA9550-16-1-0150 awarded by the Air Force Office of Scientific Research and Grant No. NSF CMMI-1661412 awarded by the National Science Foundation. The Government has certain rights in the invention.

FIELD

The present invention relates generally to scanning probe microscopy, and, more specifically, to cantilever-free atomic force microscopy.

BACKGROUND

Scanning probe microscopy involves using a physical probe to raster scan across a surface of a substrate to form an image of surface topography or other properties. Atomic force microscopy (AFM) is a leading method for obtaining information about surface topography and functional properties at micro- and nanoscales. To detect minute forces between a sharp tip and a substrate, atomic force microscopy conventionally utilizes a microscopic cantilever that deflects under the influence of local forces, giving rise to a motion that can be detected using an optical lever. However, due to the serial nature of probe-based imaging, finer spatial resolution is obtained at the cost of smaller field-of-view. Ongoing efforts to address this challenge include designing probes with higher bandwidth and adopting arrays of probes such as the IBMV Millipede. However, modern imaging arrays feature only about thirty probes, highlighting the difficulty in efficiently parallelizing cantilever-based sensing. Furthermore, some of these efforts to parallelize cantilever-based sensing have been abandoned due to complexity, cost, and delicate nature of probe arrays.

Atomic force microscopy highlights a challenge seen in microscopy, that resolution and throughput often represent a tradeoff where obtaining finer resolution typically requires imaging smaller areas. Imaging smaller areas usually means a slower imaging process. Thus, there is a need for improvements in microscopy that avoid some of the drawbacks associated with conventional solutions.

SUMMARY

According to some implementations of the present disclosure, a system includes a probe assembly, a camera, a memory, and a control system. The probe assembly includes a rigid substrate, a compliant layer provided on the rigid substrate, one or more rigid probes arranged on the compliant layer to cover coupled to at least a portion of a top surface of the compliant layer, and a reflective layer covering the one or more rigid probes and uncovered portions of the top surface of the compliant layer. The camera is configured to generate image data from the probe assembly. The memory stores machine-readable instructions. The control system includes one or more processors configured to execute the machine-readable instructions to: (a) receive the generated image data; and (b) develop a topographical image of a surface of a sample based at least in part on the received image data generated by the camera.

In an embodiment, the rigid substrate includes sapphire, glass, or quartz. In an embodiment, the compliant layer includes polydimethylsiloxane or synthetic rubbers. In an embodiment, the reflective layer includes aluminum, gold, chrome, or titanium. In an embodiment, the control system is further configured to execute the machine-readable instructions to raster scan the surface of the sample to obtain a plurality of frames, wherein the image data includes the plurality of frames. In an embodiment, developing the topographical image includes determining field of view images associated with each of the rigid probes in the probe assembly. In an embodiment, developing the topographical image includes stitching together field of view images associated with each of the rigid probes in the probe assembly. In an embodiment, overlapping regions in the field of view images are used in aligning the field of view images prior to stitching the field of view images together. Developing the topographical image can include height correction, despeckling, or desharpening.

In an embodiment, the generated image data includes at least one frame indicating locations of the one or more rigid probes as areas with lowest intensity. In an embodiment, indentation of a first probe in the one or more probes deforms a localized surface of the probe assembly, with maximum deformation occurring closer to the first probe. In an embodiment, a magnitude of indentation of the first probe is inversely proportional to light intensity around the first probe that is captured by the camera. In an embodiment, a relationship of the inverse proportionality is linear. In an embodiment, arrangement of the one or more probes, relative to each other, determines a scan size when the camera generates the image data from the probe assembly. In an embodiment, the one or more rigid probes are directly coupled to the compliant layer. In an embodiment, the reflective layer covers all of the top surface of the compliant layer, and the one or more rigid probes are arranged on the reflective layer to cover at least a portion of a top surface of the reflective layer. The one or more rigid probes are indirectly coupled to the compliant layer.

According to some implementations of the present disclosure, a probe assembly for atomic force microscopy is provided. The probe assembly includes a rigid substrate, a compliant layer provided on the rigid substrate, one or more rigid probes arranged on the compliant layer to cover at coupled to least a portion of a top surface of the compliant layer, and a reflective layer covering the one or more rigid probes and uncovered portions of the top surface of the compliant layer. Bringing the probe assembly in contact with a top surface of a sample causes the one or more rigid probes to deform the compliant layer, an extent of deformation by each of the one or more rigid probes being proportional to a localized height at the top surface of the sample.

According to some implementations of the present disclosure, a method for fabricating a probe assembly includes: (a) spinning a compliant layer on top of a rigid substrate; (b) curing the combination of the compliant layer and the rigid substrate; (c) printing providing one or more rigid probes on the compliant layer to cover portions of a top surface of the compliant layer; and (d) depositing a reflective layer on the one or more printed rigid probes and uncovered portions of the top surface of the compliant layer. In some implementations, the rigid probes have a conical shape, a cylindrical shape, or both.

According to some implementations of the present disclosure, a method for fabricating a probe assembly includes: (a) spinning a compliant layer on top of a rigid substrate; (b) curing the combination of the compliant layer and the rigid substrate; (c) depositing a reflective layer on the compliant layer; and (d) providing one or more rigid probes on the reflective layer to cover portions of a top surface of the reflective layer.

Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

FIG. 5C illustrates optical images of a single probe in the probe array of FIG. 5A at different indent distances.

FIG. 5D is a graph illustrating average pixel intensity for a single probe as a function of distance to determine a slope $\alpha$ for calibrating distance and average pixel intensity, according to some implementations of the present disclosure.

FIG. 5E is a graph illustrating a histogram of the slope a for an example probe array, according to some implementations of the present disclosure.

Figure 1:
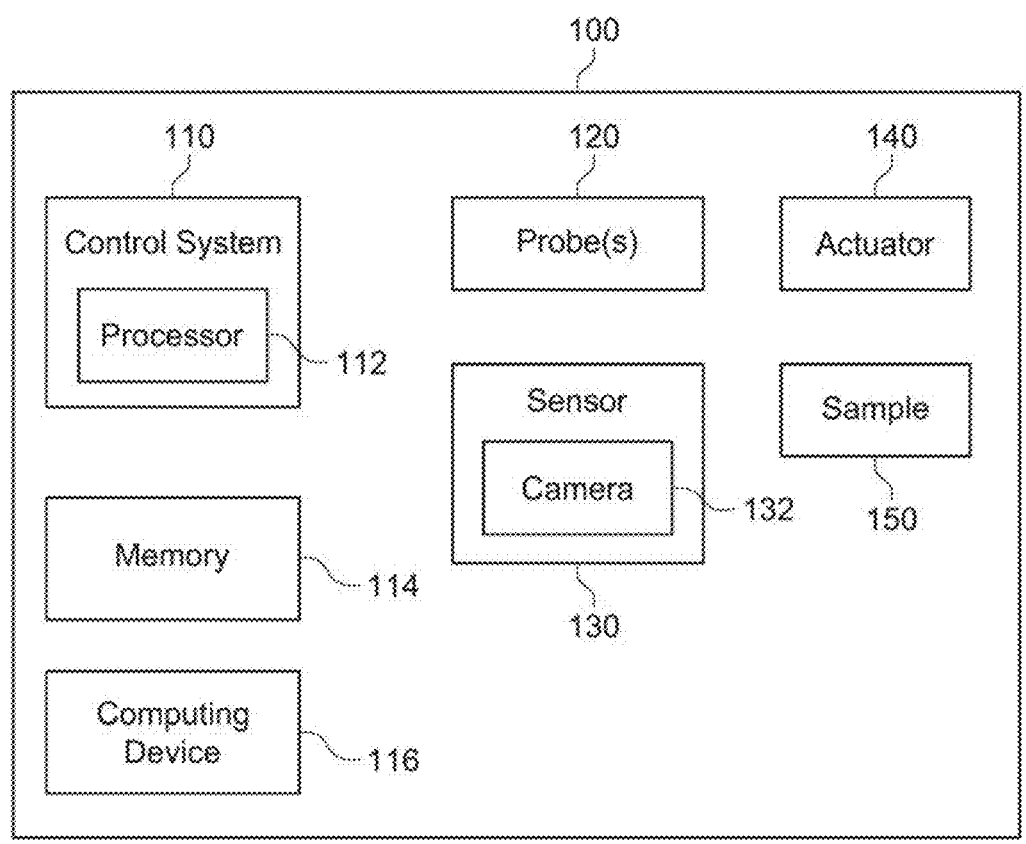
FIG. 1 illustrates a system for performing microscopy, according to some implementations of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Adoption of probe arrays for microscopy is limited, but probe arrays are widely used for scanning probe lithography. Scanning probe lithography involves defining patterns using a nanoscale physical probe through a myriad of ways such as mechanical deformation, anodic oxidation, and direct material deposition. To address limited throughput inherent to serial patterning, a cantilever-free architecture, in which an array of probes rests on a compliant film on a rigid surface, is provided. While this architecture endows the probes with the compliance needed for gentle probe-sample contact and a scalability affording up to millions of probes, the force-sensing capability afforded by the cantilever is lost. If such cantilever-free probe arrays could be modified to enable parallel detection of probe-sample contact, then the cantilever-free probe arrays can provide a system to massively parallelize atomic force microscopy and transformatively increase throughput of this impactful family of imaging tools.

Resolution and field-of-view often represent a fundamental tradeoff in microscopy. Atomic force microscopy is an example of this tradeoff, with high resolution imaging being largely limited to small areas. Despite the tremendous impact of atomic force microscopy in fields including materials science, biology, and surface science, the limitation in imaging has remained an issue with studying samples with intricate hierarchical structure. Embodiments of the present disclosure provide a method and system for realizing massively parallel atomic force microscopy that can utilize over one thousand probes to detect probe-sample contact. Embodiments of the present disclosure provide optically reflective conical probes on a comparatively compliant film such that probe motion is translated into an optical signal that provides sub-10 nm vertical precision. Embodiments of the present disclosure are scalable and suited for imaging applications where high resolution over large areas is desirable. Embodiments of the present disclosure provide systems and methods that can parallelize atomic force microscopy, transformatively increasing throughput without loss in resolution.

Referring to FIG. 1, a system 100 for performing microscopy (e.g., atomic force microscopy), is illustrated, according to some implementations of the present disclosure. The system 100 includes a control system 110, a memory 114, one or more probes 120, one or more sensors 130, an actuator 140, and a sample 150. In some implementations, the system 100 optionally includes a computing device 116 (e.g., a laptop computer, a desktop computer, a smartphone, a tablet, etc.).

The control system 110 includes one or more processors 112 (hereinafter, processor 112). The control system 110 is generally used to control (e.g., actuate) the various components of the system 100 and/or analyze data obtained and/or generated by the components of the system 100. The processor 112 can be a general or special purpose processor or microprocessor. While one processor 112 is shown in FIG. 1, the control system 110 can include any suitable number of processors (e.g., one processor, two processors, five processors, ten processors, etc.) that can be in a single housing, or located remotely from each other. The control system 110 can be coupled to and/or positioned within, for example, a housing of the computing device 116, and/or within a housing of one or more of the sensors 130. The control system 110 can be centralized (within one such housing) or decentralized (within two or more of such housings, which are physically distinct). In such implementations including two or more housings containing the control system 110, such housings can be located proximately and/or remotely from each other.

The memory 114 stores machine-readable instructions that are executable by the processor 112 of the control system 110. The memory 114 can be any suitable computer readable storage device or media, such as, for example, a random or serial access memory device, a hard drive, a solid state drive, a flash memory device, etc. The memory 114 can be coupled to and/or positioned within a housing of the computing device 116, within a housing of the sensors 130, or any combination thereof. Like the control system 110, the memory device 114 can be centralized (within one such housing) or decentralized (within two or more of such housings, which are physically distinct).

While the control system 110 and the memory device 114 are described and shown in FIG. 1 as being a separate and distinct component of the system 100, in some implementations, the control system 110 and/or the memory device 114 are integrated in the computing device 116 and/or the sensor 130. Alternatively, in some implementations, the control system 110 or a portion thereof (e.g., the processor 112) can be located in a cloud (e.g., integrated in a server, connected to the cloud, be subject to edge cloud processing, etc.), located in one or more servers (e.g., remote servers, local servers, etc.), or any combination thereof.

The one or more probes 120 are designed to contact a surface of the sample 150, such that the sensor 130 can provide data, pertaining to the surface of the sample 150, to the control system 110 for processing. The actuator 140 controls a separation between the probes 120 and the sample 150. That is, the actuator 140 can move the sample 150 to contact the probes 120, and/or the actuator 140 can move the probes 120 to contact the sample 150. In some implementations, the sample 150 is provided on a stand, and the actuator 140 moves the stand in relation to the probes 120. The sensors 130 can provide data indicating status of the probes 120 with respect to the sample 150. The sensors 130 can include a camera 132. The camera 132 outputs image data reproducible as one or more images (e.g., still images, video images, thermal images, or a combination thereof) that can be stored in the memory 114. The image data from the camera 150 can be used by the control system 110 to determine a topology of the surface of the sample 150.

Figure 2A:
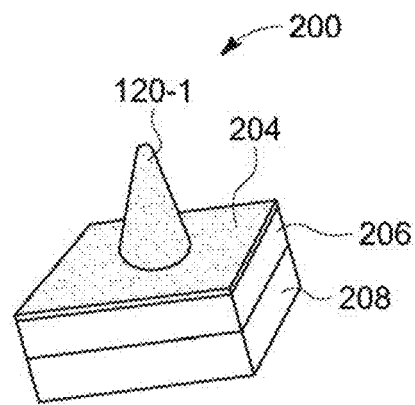
FIG. 2A illustrates a first probe assembly, according to some implementations of the present disclosure.

Referring to FIG. 2A, a probe assembly 200 is illustrated, according to some implementations of the present disclosure. The probe assembly 200 includes a substrate layer 208, a compliant film layer 206, and a reflective film layer 204. The substrate layer 208 is preferably rigid and can include materials such as sapphire, glass, quartz, etc. In certain implementations, it is desirable for the substrate layer 208 to be transparent. The compliant film layer 206 is preferably an elastomer and can include elastic material such as polydimethylsiloxane (PDMS), synthetic rubbers such as translucent Ecoflex™ silicone rubbers, or any other elastomer thin film material. The reflective film layer 204 can include metallic films such as a thin aluminum layer, gold layer, chrome layer, or titanium layer. The probe assembly 200 further includes a probe (e.g., a probe 120-1). The probe 120-1 includes a rigid probe material (not shown) underneath the reflective film layer 204. The rigid probe material can be seen as item 261 in the cross-sectional cut of FIG. 2D. The rigid probe material gives the probe 120-1 its conical shape. In some implementations, the rigid probe material is 1000× stiffer than the material of the compliant film layer 206. Although indicated as conical, in some implementations, the probe 120-1 is cylindrical, cuboid, rectangular prism, or any other polyhedron.

In some implementations, the reflective film layer 204 is provided on the compliant film layer 206 such that the reflective film layer 204 is not covering the rigid probe material of the probe 120-1. In this implementation, the rigid probe material of the probe 120-1 is provided directly on the reflective film layer 204. Thus, the rigid probe material of the probe 120-1 can be indirectly coupled to the compliant film layer 206 through the reflective film layer 204 as discussed in this implementation.

Figure 2B:
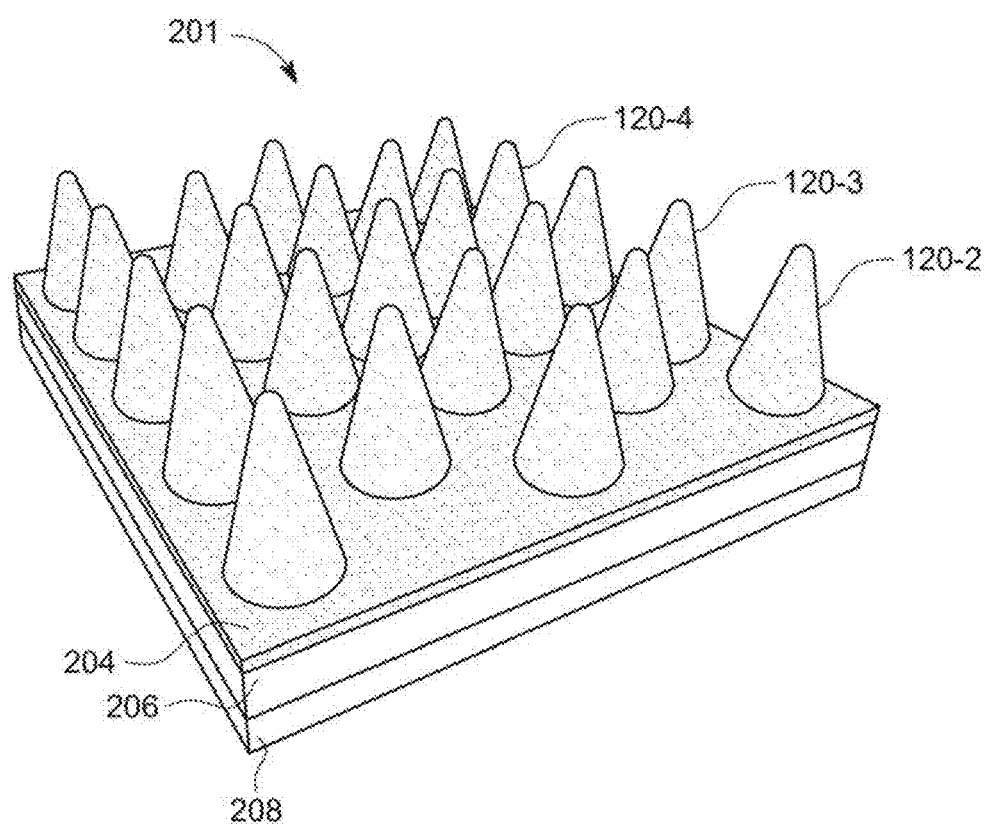
FIG. 2B illustrates a second probe assembly, according to some implementations of the present disclosure.
Figure 2C:
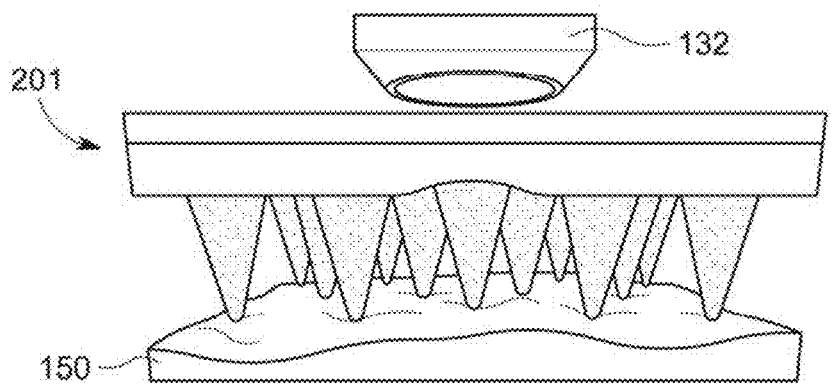
FIG. 2C illustrates a system configuration for performing atomic force microscopy, according to some implementations of the present disclosure.

Referring to FIG. 2B, a probe assembly 201 is illustrated, according to some implementations of the present disclosure. The probe assembly 201 includes multiple probes 120 (e.g., a probe 120-2, 120-3, and 120-4). The probe assembly 201 with the multiple probes 120, when provided in the configuration of FIG. 2C, can be referred to as a distributed optical lever, an array of probes, etc. FIG. 2C illustrates a system configuration for using the probe assembly 201 to perform atomic force microscopy on the sample 150, according to some implementations of the present disclosure. The camera 132 is used for measuring height of different locations on the sample 140, based on the multiple probes 120 of the probe assembly 201 coming in contact with the sample 140.

Figure 2D:
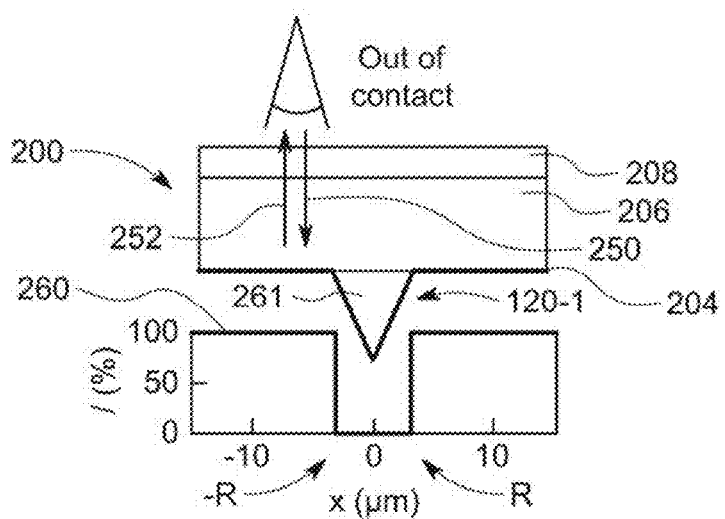
FIG. 2D illustrates a cross-section of the first probe assembly of FIG. 2A when a probe of the first probe assembly is not in contact with a sample, according to some implementations of the present disclosure.

FIG. 2D illustrates a cross-section of the probe assembly 200 when the probe 120-1 of the probe assembly 200 is not in contact with the sample 150. From the perspective of an observer (e.g., the camera 132), incident light 250 is reflected from the reflective film layer 204 at a 180-degree angle. Therefore, intensity of the reflected light 252 is comparable to the intensity of the incident light 250. Along the cross-section illustrated in FIG. 2D, intensity 260 of the reflected light captured by the observer can be measured. The intensity 260 indicates that intensity is highest (at 100%) in areas not containing the probe 120-1. The intensity 260 drops to zero in areas containing the probe 120-1. In some implementations, the rigid probe material 261 can be a light absorbent material such that locations of probes do not reflect light to the observer, thus appearing much darker than the other areas of the probe assembly 200 that do not contain probes. In some implementations, the conical shape of the rigid probe material 261 provides angled reflection such that light incident on the rigid probe material is scattered in a manner that no reflected light reaches the observer. The probe 120-1 is shown to have a radius R, with intensity 260 within this radius R being 0.

Figure 2E:
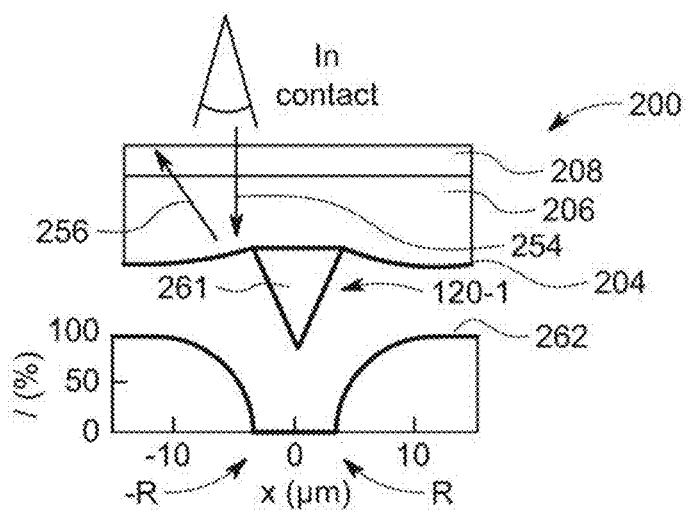
FIG. 2E illustrates a cross-section of the first probe assembly of FIG. 2A when the probe of the first probe assembly is in contact with the sample, according to some implementations of the present disclosure.

FIG. 2E illustrates a cross-section of the probe assembly 200 when the probe 120-1 is in contact with the sample 140. When in contact with the sample 140, the compliant film layer 206 is deformed. As a result of this deformation, the reflective film layer 204 no longer has a flat surface. Therefore, incident light 254 on the reflective film layer 204 reflects at angle such that the incident light 254 and reflected light 256 are not parallel. As a result, the observer sees a decline in intensity 262 at regions around the probe 120-1, where deformation of the compliant film layer 206 is most pronounced.

Figure 3A:
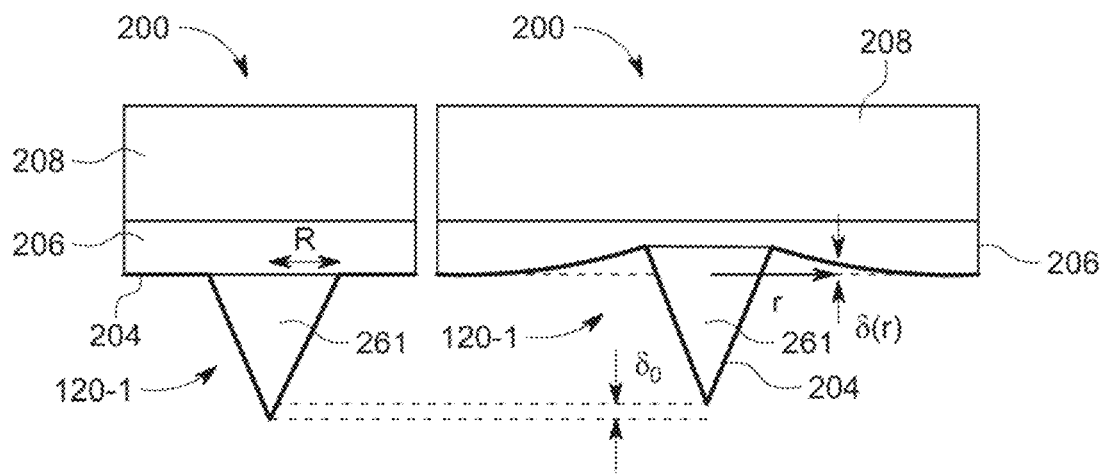
FIG. 3A illustrates parameters used in developing a model for a distributed optical lever, according to some implementations of the present disclosure.

FIG. 3A illustrates parameters used in developing a model for a distributed optical lever, according to some implementations of the present disclosure. As discussed in connection with FIGS. 2D and 2E, the compliant film layer 206 deforms in response to the probe 120-1 pushing against the sample 150 (FIG. 2C). Application of a force on the probe 120-1 will cause an indent of a distance $\delta_0$ and cause a deformation 6, along the surface of the probe assembly 200, at a radial distance r from the center of the probe 120-1. The probe assembly 200 is used to develop the model for the distributed optical lever (e.g., the probe assembly 201 of FIG. 2C). The probe 120-1 is approximated as a rigid cone with base radius R, and Hertzian contact mechanics is employed. Specifically, the probe assembly 200 is expected to behave as a linear spring with spring constant kef given by Eq. 1.

$$k_{ef} = 2RE \qquad \text{(Eq. 1)}$$

In Eq. 1, E is the elastomer modulus of the compliant film layer 206, and the elastomer Poisson's ratio is 0.5. The rigid probe material 261 of the probe 102-1 is much stiffer than the material of the compliant film layer 206. In some implementations, the rigid probe material can have a modulus of about 3 GPa, which is 10,000 times higher than the modulus of PDMS film if PDMS film were used as the compliant film layer 206. As such, deformation of the rigid probe material 260 is negligible when compared to the compliant film layer 206. Deformation 6 of the surface at the radial distance r can be described by Eq. 2.

$$\delta(r) = \delta_0 \frac{2}{\pi} \left[ \left( 2 - \frac{r^2}{R^2} \right) \sin^{-1}(R/r) + \frac{r}{R} \left( 1 - \frac{R^2}{r^2} \right)^{1/2} \right] \text{ for } \qquad \text{(Eq. 2)}$$

$$r \geq R,$$

Figure 3B:
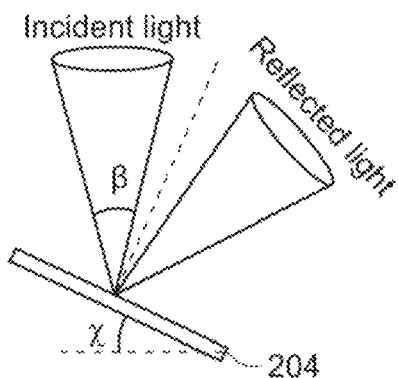
FIG. 3B illustrates parameters used to characterize sloping of a surface of the first probe assembly, according to some implementations of the present disclosure.

As discussed in connection with FIGS. 2D and 2E, deformation at the surface of the probe assembly 200 causes incident and reflected light to have a change in angle such that incident and reflected light are no longer parallel to each other. Sloping of the surface causes this change in angle that renders incident light and reflected light to no longer be parallel. Referring to FIG. 3B, a slope of the surface can be used to determine the angle of light reflection. A local angle $\chi$ that defines the sloping, at specific locations along the surface of the probe assembly 200, is described by Eq. 3.

$$\tan \chi = \frac{\partial \delta(r)}{\partial (r)} \qquad \text{(Eq. 3)}$$

Taking the derivative of Eq. 2 and substituting in Eq. 3 provides Eq. 4.

$$\tan\chi = \frac{2\delta_0}{R} f\left(\frac{r}{R}\right) \quad \text{(Eq. 4)}$$

In Eq. 4, f(r/R) is defined in Eq. 5.

$$f\left(\frac{r}{R}\right) = \frac{2}{\pi}\left[-\frac{r}{R}\sin^{-1}\left(\frac{R}{r}\right) + \left(1 - \frac{R^2}{r^2}\right)^{1/2}\right] \quad \text{(Eq. 5)}$$

Figure 3C:
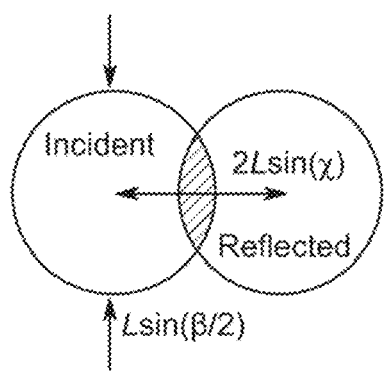
FIG. 3C illustrates a model for incident and reflected light used in developing the model for the distributed optical lever, according to some implementations of the present disclosure.

In Eq. 5, f(r/R) is −1 at r=R and asymptotes to 0 when r is much greater than R. Having found a relationship between the vertical motion of the probe 120-1 and the slope of the surface of the probe assembly 200, the optical consequences of the motion of the probe 120-1 is determined. Assuming uniform illumination by a circular aperture that has an angular aperture β, change in light intensity I relative to a maximum intensity $I_{max}$ upon specular reflection from a flat surface with tilt angle χ can be computed. Referring to FIG. 3C, this computation amounts to determining the overlapping region between two circles of radius L sin β/2. The center points of the two circles are displaced by a distance 2L sin χ where L is the distance between the focal point and the objective. Eq. 6 provides an expression for change in intensity as a function of the tilt angle.

$$\frac{I(\chi)}{I_{max}} = \frac{2}{\pi}\cos^{-1}\left(\frac{\sin\chi}{2\sin\frac{\beta}{2}}\right) - \frac{\sin\chi}{2\pi\sin\frac{\beta}{2}}\sqrt{\left(4 - \frac{\sin^2\chi}{\sin^2\frac{\beta}{2}}\right)} \quad \text{(Eq. 6)}$$

Figure 3D:
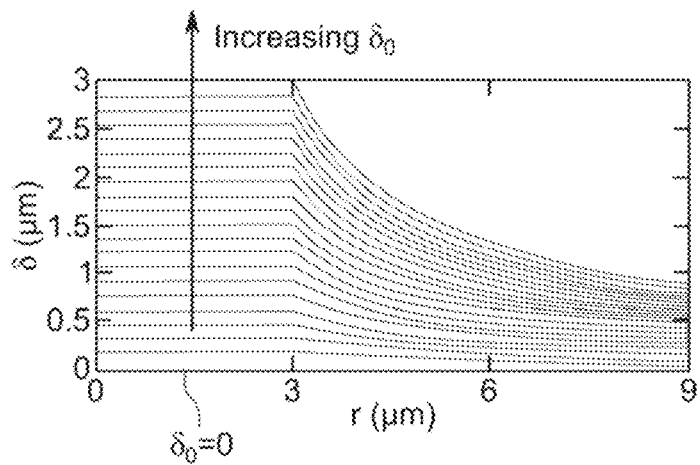
FIG. 3D illustrates deformation profiles of the surface of the first probe assembly for different indent distances, according to some implementations of the present disclosure.
Figure 3E:
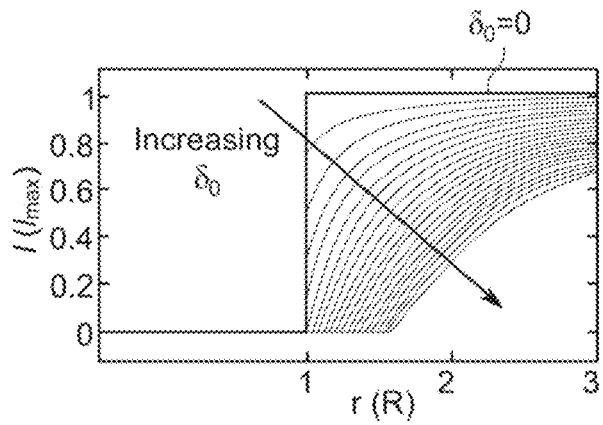
FIG. 3E illustrates reflected light intensity normalized by a maximum intensity derived from the model for the distributed optical lever, according to some implementations of the present disclosure.
Figure 3F:
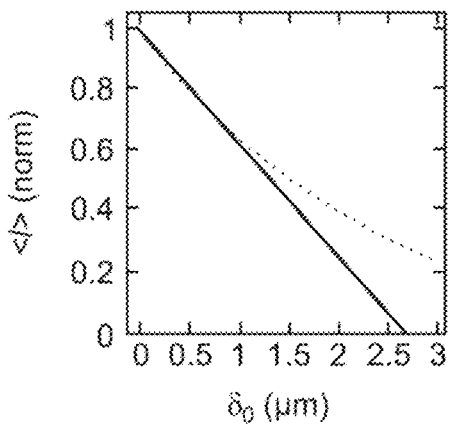
FIG. 3F illustrates average intensity around a probe of the first probe assembly, according to some implementations of the present disclosure.

Taken together, the mechanical and optical models allow predicting the optical contrast upon probe deformation of the compliant film layer 206. For example, FIG. 3D illustrates deflection profile of the surface of the compliant film layer 206 for different indentation distances $\delta_0$ based on Eq. 2. Further, Eq. 4, 5, and 6 may be combined to produce an expected I profile vs. r as depicted in FIG. 3E. In FIG. 3E, reflected light intensity normalized by maximum intensity $I_{max}$ is calculated using Eqs. 4, 5, and 6. In generating FIG. 3E, R=3 μm and β=22.5 (computed for an objective with a 0.28 numerical aperture in a medium with a 1.43 index of refraction). Using this model, the predicted intensity in a 15 μm diameter circle can be averaged around a probe, and the average I can be computed. The average I is found to be linear with $\delta_0$ in the range $0<\delta_0<1$ μm as illustrated in FIG. 3F. In FIG. 3F, the curve is approximated by a linear fit that has a slope of 0.37 μm$^{-1}$. Note that the range for linear behavior (i.e., between 0 and 1 μm) is a product of the design values selected.

When considering small deformations, the derived expressions can be simplified. In small deformations, $\delta_0$ is much less than R, thus, Eq. 4 can be simplified to the expression provided in Eq. 7.

$$\chi \approx \frac{2\delta_0}{R} f\left(\frac{r}{R}\right) \quad \text{(Eq. 7)}$$

Similarly, Eq. 6 can be linearized, assuming χ is a small angle, to provide Eq. 8.

$$\frac{I(\chi)}{I_{max}} \approx \left(1 - \frac{|\chi|}{\pi\sin\frac{\beta}{2}}\right). \quad \text{(Eq. 8)}$$

Combining Eq. 7 and Eq. 8 leads to Eq. 9.

$$\frac{I\left(\frac{r}{R}, \delta_0\right)}{I_{max}} \approx \left(1 - \frac{2\delta_0}{\pi R \sin\frac{\beta}{2}}\left|f\left(\frac{r}{R}\right)\right|\right) \text{for } r \geq R. \quad \text{(Eq. 9)}$$

Given the monotonic nature of f(r), the point on the surface with the highest resolving power will be the region directly on the border between the conical probe (e.g. r=R) and the compliant film layer 206 (see e.g., r=3 in FIG. 3D). Thus, using this approximation, the sensitivity of the distributed optical lever can be estimated as Eq. 10.

$$\frac{\partial I}{\partial \delta_0}(r = R, \delta_0) = -\frac{2I_{max}}{\pi R \sin\frac{\beta}{2}} \quad \text{(Eq. 10)}$$

Eq. 10 suggests design criteria for high performance. That is, small probes (related to R), small numerical aperture objectives (related to β), and bright light sources (related to $I_{max}$) will result in the highest sensitivity. Practically, gain and exposure settings of the camera 132 should be adjusted such that $I_{max}$ corresponds to an intensity value of 1 in the camera 132. The bit depth N of the camera 132 will determine the minimum resolvable intensity change $\Delta I_{cam}$, which describes an expected sensitivity described by Eq. 11.

$$\Delta I_{cam} = \frac{I_{max}}{2^N} \quad \text{(Eq. 11)}$$

Combining Eq. 9 and Eq. 10 allows estimating the minimum resolvable deflection $\Delta\delta_0$ as Eq. 12.

$$\Delta\delta_0 = \frac{\pi R \sin\frac{\beta}{2}}{2^{N+1}}, \quad \text{(Eq. 12)}$$

In some implementations, an 8-bit camera is able to resolve a 1 nm deflection with R=3 μm and β=22.5°.

Figure 4A:
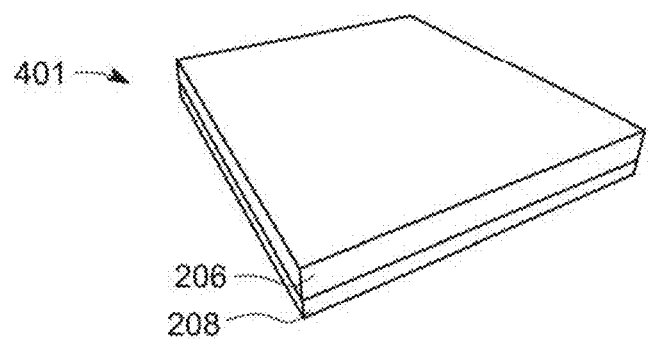
FIG. 4A illustrates a first step in manufacturing a probe array, according to some implementations of the present disclosure.
Figure 4B:
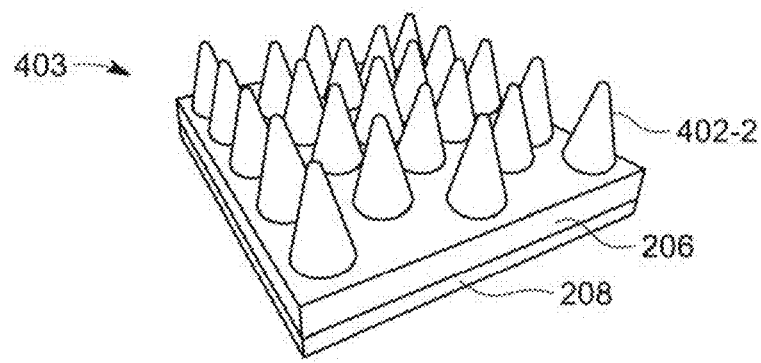
FIG. 4B illustrates a second step in manufacturing the probe array, according to some implementations of the present disclosure.
Figure 4C:
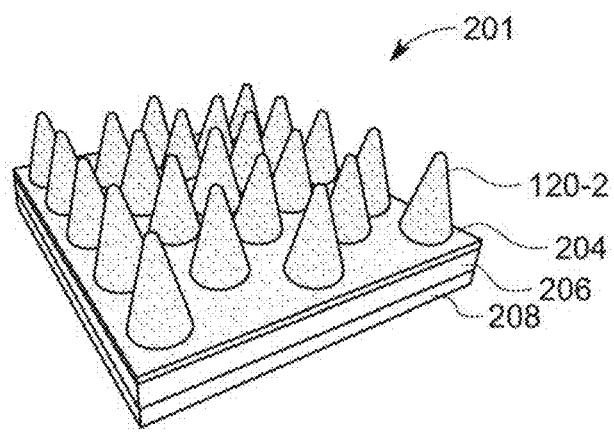
FIG. 4C illustrates a third step in manufacturing the probe array, according to some implementations of the present disclosure.

FIGS. 4A-4C illustrate steps in manufacturing the probe assembly 201, including the multiple probes 120, of FIG. 2C. In FIG. 4A, item 401 is a result of providing the compliant film layer 206 on the substrate layer 208. In an embodiment, the substrate layer 208 is a sapphire wafer. The sapphire wafer is spin-coated with PDMS. PDMS is composed of Sylgard 184 prepared with a 25:1 base:crosslinker ratio by weight. The sapphire wafer can be spin-coated at 1,000 rotations per minute for 60 seconds and then cured at 100° C. for 1 hour. The high base:crosslinker ratio of 25:1 for the PDMS can be selected to make the compliant film layer 206 yielding to applied force and to minimize the spring constant of the multiple probes 120.

Item 403 of FIG. 4B is a result of printing multiple shapes 402 (e.g., conical shape 402-2) on the surface of the cured PDMS (the compliant film layer 206). The multiple shapes 402 are printed using a rigid probe material (e.g., a resin material). In some implementations, direct laser writing is used to print the multiple shapes 402 on the surface of the cured PDMS. In some implementations, two photon polymerization direct laser writing is used to print (or write) the multiple shapes 402 on the surface of the cured PDMS. In some implementation, the Photonic Professional GT Nanoscribe 3D printer is used for printing the multiple shapes 402 on the surface of the cured PDMS. In some implementations, the multiple shapes 402 are written using IP-dip resin procured from Nanoscribe at 63 times magnification with slicing and hatching distances of 100 nm to ensure solid and smooth structures. FIG. 4B illustrates conical shapes which are merely provided as an example. Other shapes are envisioned, e.g., cylindrical shapes, cuboids, or any combination of different shapes. Printing the multiple shapes 402 on the surface of the cured PDMS is provided as an example. In some implementations, the multiple shapes 402 can be provided on the PDMS layer using greyscale photolithography, anisotropic etching of silicon, molding in micro-machined masters, etc.

FIG. 4C illustrates a third step in the manufacturing of the multiple probes 120. The resulting structure of the step of FIG. 4B (i.e., item 403) is coated with the reflective film layer 204. The surface of the multiple shapes 402 and exposed surfaces of the cured PDMS are coated with a reflective material. In some implementations, the reflective material is a 30 nm layer of aluminum (e.g., 99.99% aluminum pellets can be provided as the reflective film layer 204). The 30 nm layer of aluminum can be deposited using electron beam evaporation platform at a 0.2 As deposition rate.

In some implementations, the steps implicated by FIGS. 4B and 4C are performed in reverse order. That is, the reflective film layer 204 can be coated on the surface of the cured PDMS, prior to printing the multiple shapes 402. Thus, the resulting structure of FIG. 4A (item 401) is coated with material of the reflective film layer 204. The material of the multiple shapes 402 can then be printed atop the reflective film layer. Note that in this implementation, the reflective film layer does not cover the printed material of the multiple shapes 402. Thus, the multiple shapes 402 can be directly coupled to the compliant layer as illustrated in FIG. 4B. Or the multiple shapes 402 can be indirectly coupled to the compliant layer (i.e., through the reflective film layer) as provided in this implementation.

Figure 4D:
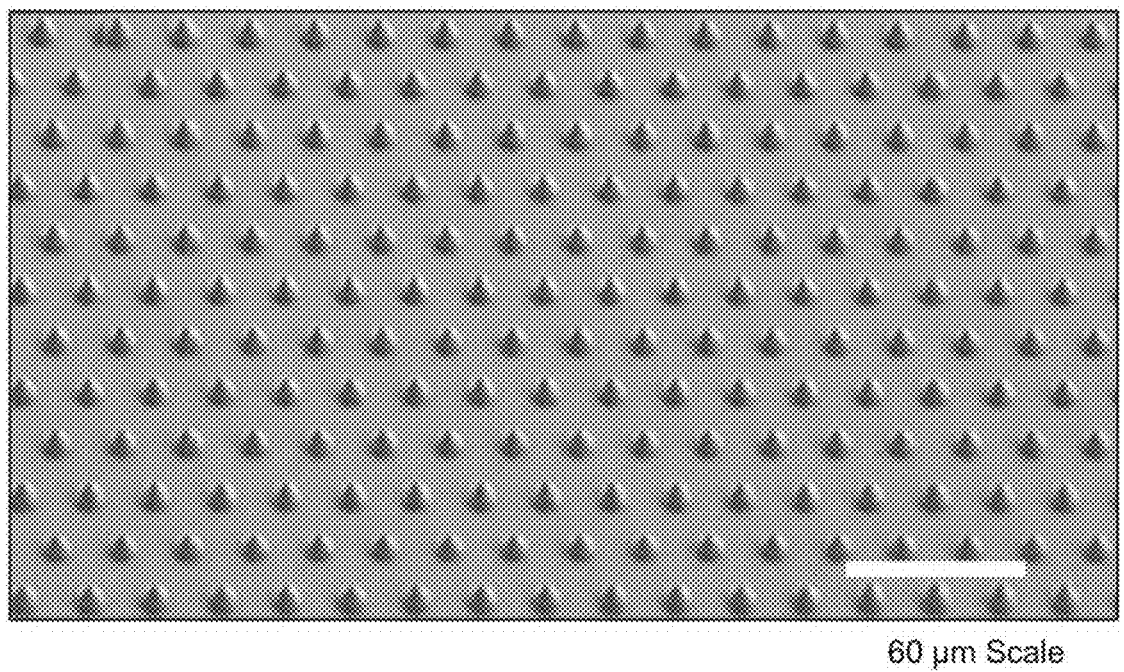
FIG. 4D is an image of a fabricated probe array, according to some implementations of the present disclosure.
Figure 4E:
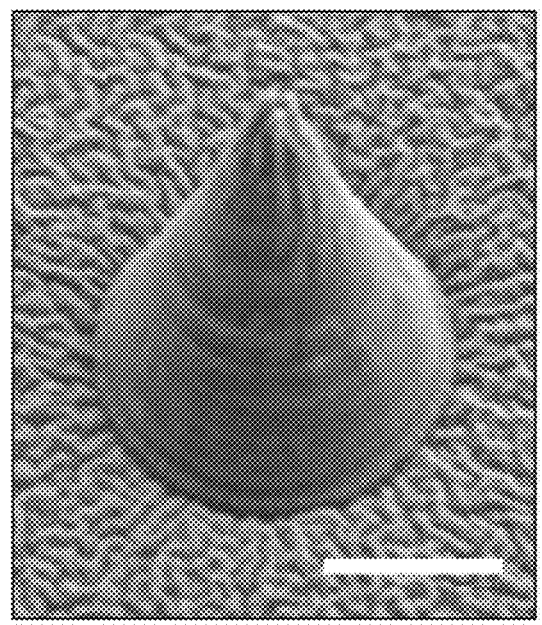
FIG. 4E is an image of a single probe in the probe array of FIG. 4D.

FIG. 4D is an image of a surface of a fabricated probe array, according to some implementations of the present disclosure. A zoomed in portion of the fabricated probe array of FIG. 4D is provided in FIG. 4E showing a structure of a sample probe on the fabricated probe array. FIG. 4D and FIG. 4E have scale bars with 60 μm and 3 μm, respectively. In contrast with conventional methods of fabricating rigid probes, two photon polymerization direct laser writing enables writing arbitrary probe geometries with optically pristine interfaces. From the images provided in FIGS. 4D and 4E, the final probe structures consisted of planar arrays of polymeric probes. These probes were mechanically characterized to reveal that each behaves as a linear spring with spring constant of about 10 N/m. Probes with this spring constant are appropriate for cantilever-based atomic force microscopy.

Figure 5A:
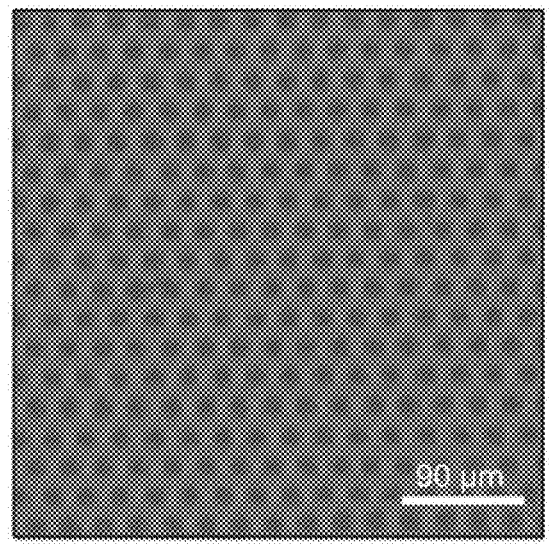
FIG. 5A is an optical image of a probe array when not in contact with a surface of a sample, according to some implementations of the present disclosure.
Figure 5B:
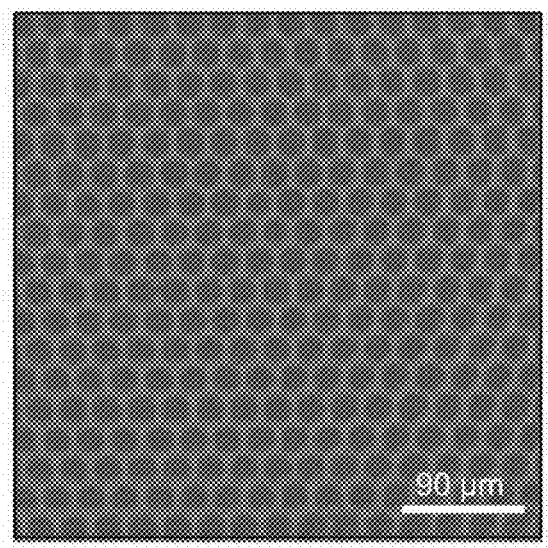
FIG. 5B is an optical image of the probe array of FIG. 5A in contact with the sample, according to some implementations of the present disclosure.

A distributed optical lever having the structure of the probe assembly 201 was used to evaluate massively parallel atomic force microscopy. A probe array of 1,088 probes was manufactured according to the steps provided in FIGS. 4A-4C. The probe array was mounted in a scanning probe instrument (which includes, e.g., a stand, one or more sensors, and the actuator 140 of FIG. 1). Bright field optical images taken through the sapphire wafer (e.g., using the camera 132) depicted an array of dark spots, each corresponding to a single probe. FIG. 5A illustrates one such image when the probe array was out of contact with a surface of a flat silicon wafer (e.g., the sample 150). The probe array was brought in proximity to the flat silicon wafer and leveled with respect to the surface of the flat silicon wafer using force feedback. To calibrate the distributed optical lever associated with each probe, the probe array extension Z was increased until the force feedback registered probe array-sample contact. Notably, the size and intensity of the dark spot corresponding to each probe changed drastically upon contact. The probe array extension Z in this case is how far the probe array is lowered towards the sample from a reference position. FIG. 5B illustrates an optical image of the probe array of FIG. 5A in contact with the flat silicon wafer. The size and intensity of the dark spot corresponding to each probe changed drastically upon contact, when comparing FIGS. 5A and 5B.

To more quantitatively analyze the change in optical contrast with increasing Z, image processing (e.g., by the control system 110) was used to identify the center of each probe and average the pixel brightness in a 15 μm diameter circle centered on each probe. This average pixel brightness, when normalized using an image of the probe array out of contact, was defined to be the intensity I. FIG. 5C illustrates optical images of a single probe at different distances Z. From left to right, Z=1, 2, 3, and 4 sm.

Figure 6:
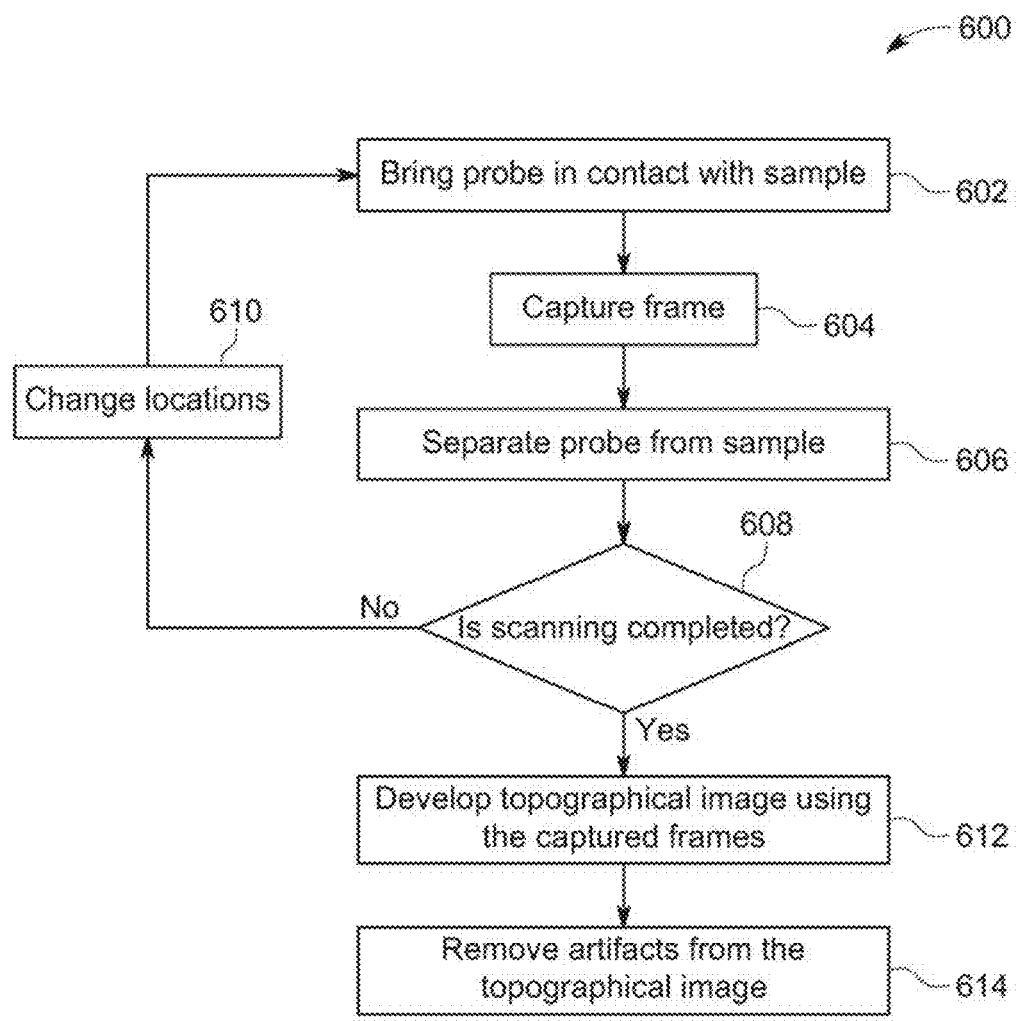
FIG. 6 is a flow diagram for a process of topographical image construction, according to some implementations of the present disclosure.

FIG. 5D illustrates intensity I as a function of how far the probe array is lowered from an initial starting position, according to some implementations of the present disclosure. The solid line is a fit, and the circles are specific data points. As predicted, intensity I did not change with respect to Z prior to probe-sample contact. Probe-sample contact is made at around Z=1 um. Upon contact, as illustrated in the graph 570 of FIG. 5D, intensity I decreased linearly with increasing Z. The linear decrease enables a direct translation between the optical signal and surface height. Specifically, the linear decrease can be fit such that the expression $I=\alpha(h-Z)$ is obtained for intensity I. $\alpha$ is slope of the linear decrease, and h denotes the point at which the probe makes contact with the flat silicon wafer a direct measure of sample height. Once probe-sample contact is made for a calibrated probe, one measurement of I is sufficient to compute h. FIG. 5E is a graph 580 illustrating a histogram of the slope $\alpha$ for each of the calibrated probes in the probe array. FIG. 6 is a flow diagram for a process 600 of developing a topographical image of a surface of the sample 150, according to some implementations of the present disclosure. In developing the topographical image, a cantilever-free approach to atomic force microscopy is used. The steps in FIG. 6 will be described with aid from the system 100 of FIG. 1. At step 602, the control system 110 brings the probes 120 in contact with the surface of the sample 150. The distance between the camera 132 and the probes 120 can be kept constant after calibration, and the sample 150 can be brought in contact with the probes 120. For example, once calibrated, the probes 120 are moved a constant distance down to contact the sample 150. In other implementations, the sample 150 can be moved a constant distance up to contact the probes 120.

At step 604, the camera 132 captures an image of the probes 120 from the vantage point as disclosed in FIG. 2A. An example image is provided in FIG. 5B.

At step 606, the probes 120 are separated from the sample 150 such that the probes 120 no longer touch the surface of the sample 150.

At step 608, the control system 110 determines whether all frames of interest have been captured (or whether scanning of the surface of the sample 150 is completed). If there are still portions of the surface of the sample 150 to be captured, the actuator 140 moves the sample 150 laterally at step 610. Once the sample 150 is moved laterally at step 610, step 602 is performed again, but this time, when the probes 120 come in contact with the surface of the sample 150, the probes 120 contact the surface at a different location due to the lateral move.

At step 608, if there are no remaining portions of the surface of the sample 150 to be captured, then at step 612, the control system 110 develops topographical image of the surface using the captured image frames of steps 602 to 610. In some implementations, intensities measured in the different captured frames around each probe indicate surface deformation. An intensity-indentation model (e.g., the model of FIG. 3F) can then be used to translate intensity levels around each of the probes to the indentation of each of the probes 120. Relative indentation between probes in the probes 120 provides topographical information for a portion of the surface of the sample 150. For each captured image frame, topographical information can be determined and then stitched together to obtain the topographical image for the sample 150.

At step 614, the control system 110 removes artifacts from the topographical image of 614. Step 614 can include several image processing techniques, e.g., despeckling, desharpening, height adjustments, etc.

The connection between optical contrast and probe deformation indicates that the process 600 of FIG. 6 can be use cantilever-free atomic force microscopy to generate topographical images of the surface of the sample 150. In particular, if the probe array (e.g., the probes 120) is brought into contact with the surface of the sample 150 and an optical picture is taken, this picture can be considered a "frame" that contains information about the height of specific locations on the sample 150 beneath each probe. Since the sample 150 can be raster scanned laterally with respect to the probe array (i.e., in the x-y plane), the process of bringing the probe array into contact and taking an optical image can be repeated such that subsequent frames are collected while the probe array visits a grid of points. In this way, the topographical information about the entire sample area beneath the probe array can be retrieved with a pixel density that is determined by the number of frames. The process 600 of FIG. 6 has an advantage that the probes 120 do not move laterally while in contact with the sample 150. Specifically, the probes 120 move vertically into contact with the sample 150, are held fixed for a contact time, and then are withdrawn until force sensors on the scanning instrument register that the probes 120 are out of contact prior to the lateral move that brings the probes 120 into their next lateral position. Because of this, abrasion, which is common in contact mode imaging, is not present. In some implementations, the force sensors are a scale where the sample 150 is positioned on the scale such that the probes 120 contacting the sample 150 affects weight registered on the scale. The registered weight increasing above a threshold can indicate contact between the probes 120 and the sample 150, and the registered weight decreasing below the threshold can indicate that the probes 120 and the sample 150 are out of contact.

Figure 7:
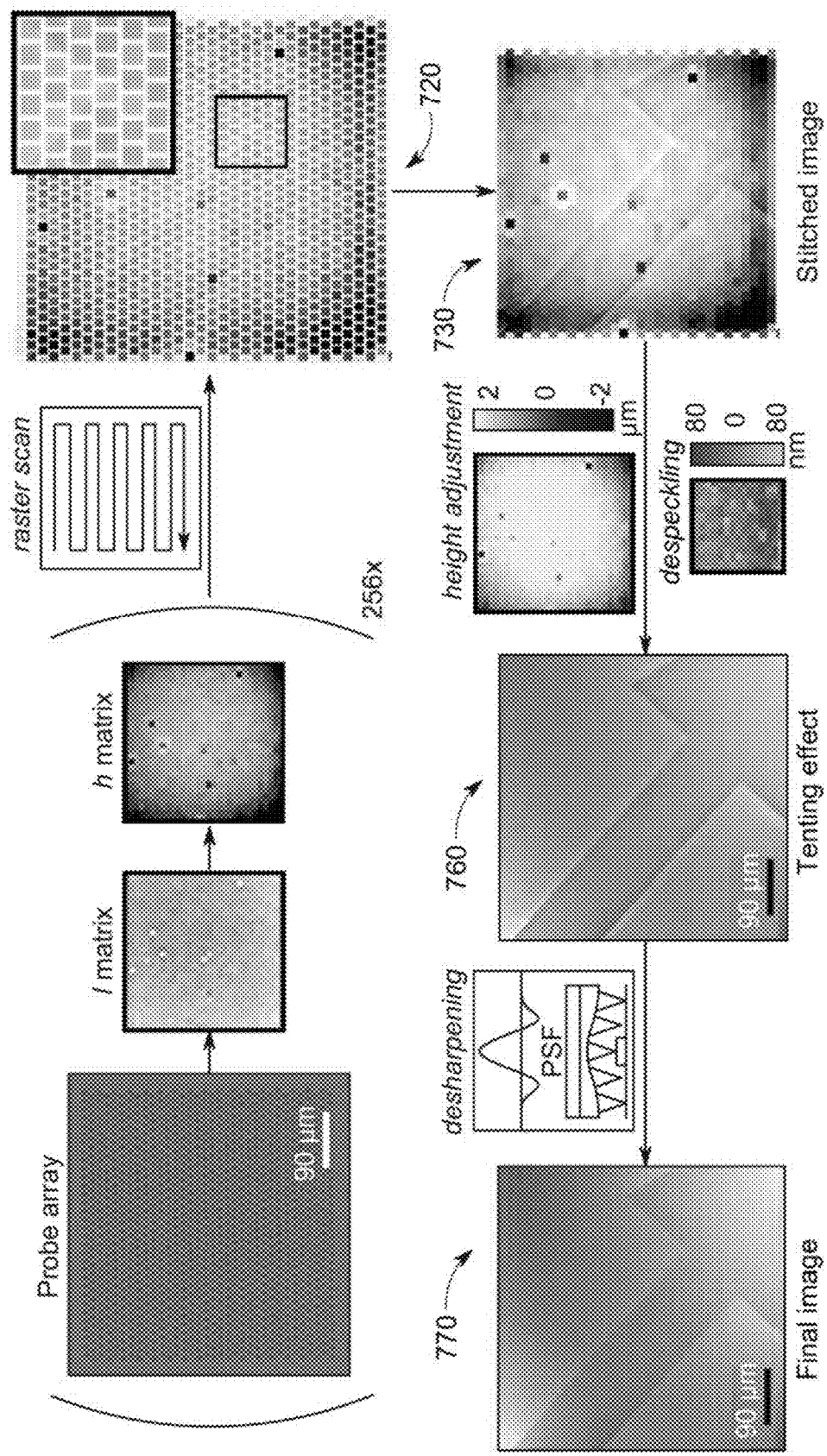
FIG. 7 is a flow diagram including exemplary images obtained during a process of topographical image construction, according to some implementations of the present disclosure.

FIG. 7 is a flow diagram providing different image examples during a process of topographical image construction, according to some implementations of the present disclosure. FIG. 7 provides an example reconstruction algorithm that can be used to accurately reconstruct the series of optical images or frames (obtained using steps 602 to 610 of FIG. 6) into a topographical image. The experimental setup for producing the images used to describe the reconstruction algorithm of FIG. 7 involved a cantilever-free probe array (e.g., FIG. 2B) being mounted in a scanning probe instrument (a Tera-print TERA-Fab E series), with the probes of the cantilever-free probe array pointing downward (e.g., FIG. 2C). The scanning probe instrument allowed the probe array to move vertically and tilt under piezoelectric control while the stage beneath the probe was moved in the x-y plane under piezoelectric control. A high resolution camera (Point Grey Grasshopper GS3-US-32S4C-C) and a 10× Mitutoyo objective lens (NA=0.28) were mounted. An atomic force microscopy calibration sample (MikroMasch TGXYZ02) was placed on the sample stage to serve as the sample to be imaged. To obtain an image, the sample was raster scanned in a square pattern 15×15 µm$^2$ with a step size of 1 µm. For each sample imaged, a video in audio video interleave (AVI) format was recorded of the entire raster scan process. The scan size was determined by the probe array pitch as the probes were printed on a hexagonal grid with a 15 µm spacing. In addition, high resolution line scans were also performed with a 100 nm step size.

In the first step of the reconstruction algorithm of FIG. 7, the locations of the probes 120 in the optical image were determined using a Hough transform. The Hough transform is a linear transformation that is applied to a matrix to locate circular features. In some implementations, applying the Hough transform entails specifying a radius of interest in units of pixels. Then, a transformed image is produced in which, the value of each pixel is determined by the intensities of the pixels in the original image on a circle with the specified radius centered on the pixel's position. The locations of the probes 120, once determined using the Hough transform, were used to compute an intensity Imatrix based on averaging the pixel brightness around each of the probes 120. For example, the intensity I matrix can be obtained by averaging pixel brightness in a 15 µm diameter circle centered on each probe.

Next, the intensity Imatrix was converted into a sample height h matrix using the probe array calibration, which was unchanging as the probe array did not move relative to the optics. An example model to determining height values that would be provided in the sample height h matrix is provided in connection with FIGS. 5D and 5E as discussed above. The process designated by "probe array" to intensity "Imatrix" to sample height "h matrix" as depicted in FIG. 7 was repeated for each frame until each of the probes 120 had visited a 15×15 µm$^2$ field-of-view (e.g., each of the different images 720 corresponds to a single probe's field-of-view). For each of the probes 120, a 15×15 µm$^2$ field-of-view with step size of 1 µm between measurements implicates 16×16 total measurements in the 15×15 µm$^2$ field-of-view, thus the 256× referenced in FIG. 7. In the example of FIG. 7, the probes in the probe array were hexagonally packed with a 15 µm probe-to-probe spacing, hence the 15×15 µm$^2$ field-of-view. See, for example, FIG. 5A where each row of probe images is offset from the previous row. For a respective probe not at the edges of the image in FIG. 5A, a hexagon connecting neighboring probes can be drawn around the respective probe. Referring back to FIG. 7, hexagonal packing of the probes resulted in the square fields-of-view captured by each probe overlapping with those of four neighboring probes. The overlapping fields-of-view facilitates stitching the different images 720 into a continuous image 730.

Cantilever-free atomic force microscopy, according to some implementations of the present disclosure, can introduce a few classes of imaging artifacts that should be corrected to accurately image the surface of the sample 150. For instance, the probes 120 may vary in height. However, the field-of-view overlap between neighboring probes provides an avenue for addressing this potential variability in probe height. For example, for a location (x, y) on the sample that is visited by two probes (e.g., probes 120-1 and 120-2), deviation in sample height can be specified as $\Delta h_{1,2} = h_1(x, y) - h_2(x, y) = H_1 - H_2$ were $H_1$ is the height of probe 120-$i$. For a probe array with k total probes, there are ~2k distinct overlapping regions, so this presents a linear system of equations that can be solved using a least-squares method. Thus, a deviation vector $\Delta h$ and a connectivity matrix K for defining $\Delta h = KH$ that can be solved as $H = (K^T K)^{-1} K^T \Delta h$. For the image examples of FIG. 7, the standard deviation of H was found to be 1.4 µm. In addition to variations in probe height, Z can vary frame-to-frame due to the repeatability of stage motion. As a measure of this, the mean of h for each frame was computed and found to have a 32 nm standard deviation. This offset can be removed by shifting the mean of each frame to be zero. This mean-shifting is analogous to a despeckling process. The ~2k distinct overlapping regions feature is not inherent to hexagonal arrangement and can be extended to a square arrangement if imaging area is larger than inter-probe spacing such that the field of view of some of the probes in the square arrangement overlap.

As a final step in the image reconstruction algorithm of FIG. 7, the probes 120 may not be mechanically isolated from one another due to their close proximity (15 µm) to each other. Thus, deforming one probe physically moves neighboring probes resulting in proximal probes registering an artificial change in h. From an image processing perspective, this artifact is a sharpening process as it enhances contrast between neighboring probes and is visible as a border between regions with different heights as illustrated in image 760. The edges of the arrow are more pronounced than should be. This artifact was removed by estimating the point spread function (PSF) and using a deconvolution to recover the original image. The process of estimating the PSF and using the deconvolution is a desharpening operation. Once complete, the final reconstructed image is produced as the final image 770. This empirical measure of crosstalk in which probes move vertically 35% the distance as their neighbors is in agreement with the 29% value predicted by finite element simulations.

In some implementations, the image reconstruction algorithm of FIG. 7 utilizes overlapping regions by computing a deviation vector $\Delta h$ as the difference in h registered for each location on the sample in the overlapping region. Then the deviation vector $\Delta h$ is paired with the connectivity matrix K. Then despeckling is removed by reducing each h by the average h taken by all probes in a respective frame.

Embodiments of the present disclosure also provide longevity in lifetime of probes. For example, with polymeric probes prepared using direct laser writing, continuous imaging in contact mode for eight hours does not produce a degradation in image quality. Further, intermittent contact imaging described herein produces less probe wear due to the lack of lateral motion during contact. Thus, tip wear of the probes 120 is not likely to be a major limiting feature to cantilever-free atomic force microscopy, according to some implementations of the present disclosure. Overlapping fields-of-view are discussed above in connection with facilitating obtaining the continuous image 730, dealing with differences in probe heights, and dealing with differences introduced by frames taken at different heights due to separation and re-contact of the probes 120 with the sample 150. In some implementations, overlapping fields-of-view can be used to further provide a method for dealing with broken probes by increasing the imaging area such that nominally, each region is imaged by multiple probes.

Figure 8A:
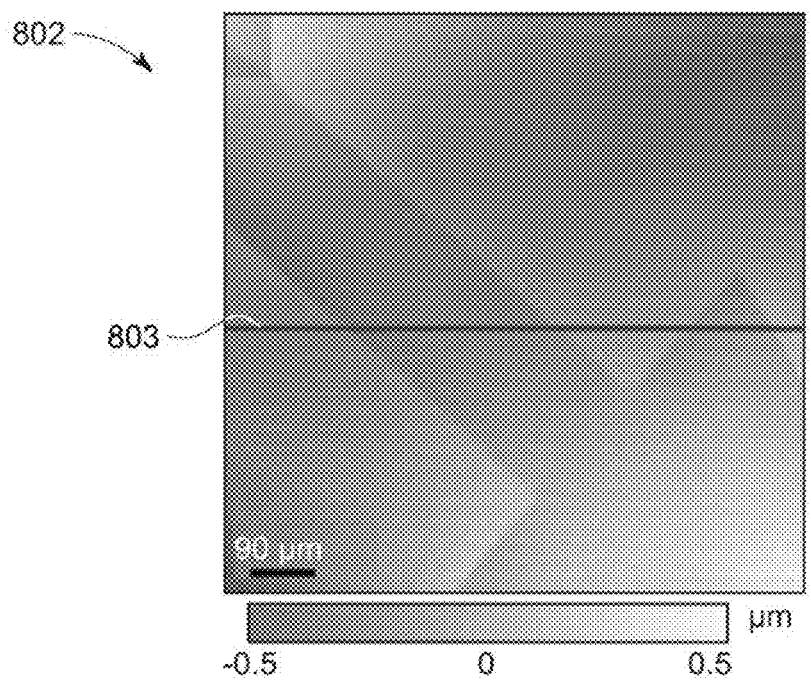
FIG. 8A illustrates an image of a sample used for imaging with cantilever-free scanning probes, according to some implementations of the present disclosure.
Figure 8B:
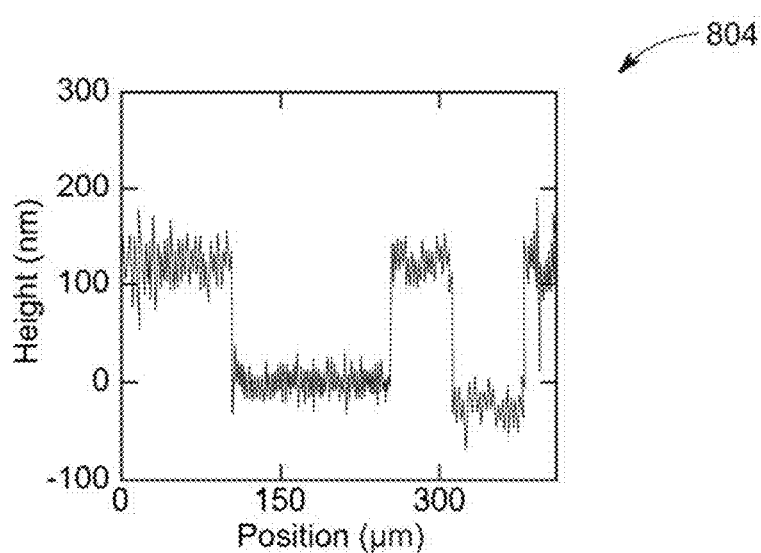
FIG. 8B is a graph illustrating height profile of a sample, according to some implementations of the present disclosure.

In order to evaluate the imaging process and the image reconstruction algorithm of FIG. 7, test scans were run on a number of regions of the atomic force microscopy calibration sample. FIGS. 8A and 8B illustrate examples of imaging with cantilever-free scanning probes, according to some implementations of the present disclosure. FIG. 8A illustrates an arrow feature (image 802) on a calibration grid imaged with a 1 µm horizontal resolution. The image 802 is a surface image of a portion of a sample with a horizontal scale provided as 90 µm as shown. Height of the sample at locations along the surface of the sample is indicated by the shading. A fiducial arrow feature (image 802) with a 110 nm depth was measured. A line scan of this sample along the path 803 was taken at 100 nm lateral spacing, which revealed a set of discrete vertical jumps with average step height 126 nm, within 15% of the atomic force microscopy measurement of 110 nm. Graph 804 of FIG. 8B provides the measured height across the image 802 indicated by the horizontal path 803. It is worth emphasizing that this line scan represented an aspect ratio of over 10,000 where the vertical precision is estimated as 9 nm (from the root mean square error in flat regions) over the >0.4 mm horizontal span. This approximated precision is in agreement with a ~6 nm estimate of the precision estimated using conventional atomic force microscopy to deform a single probe.

Figure 8C:
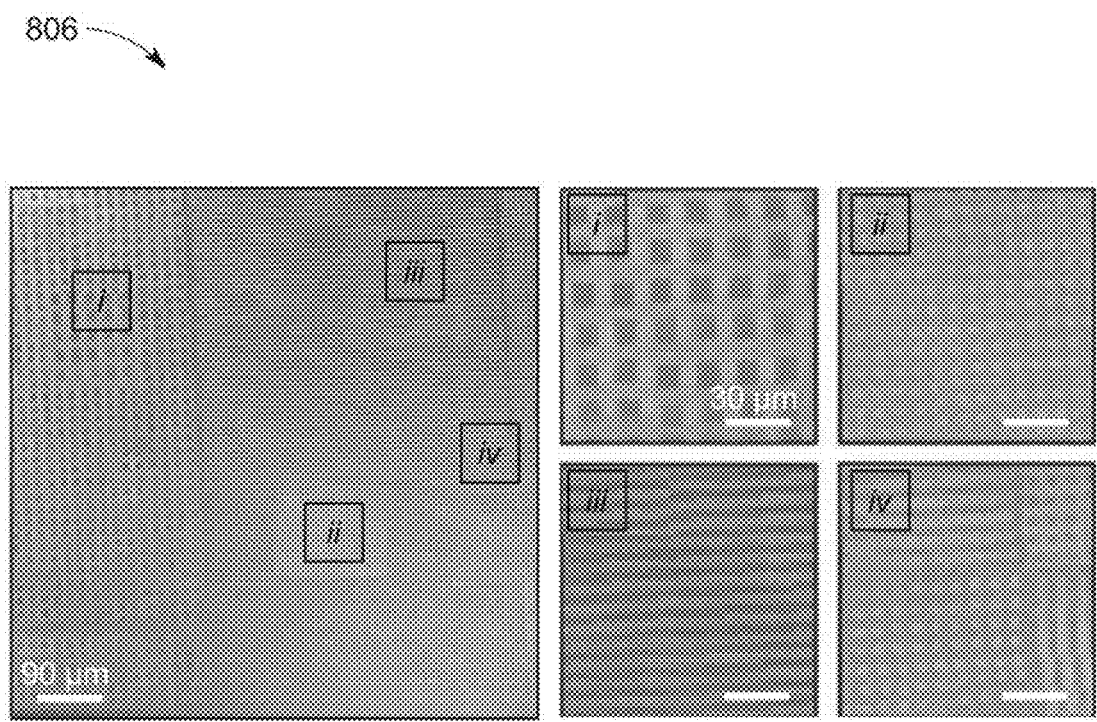
FIG. 8C is an image of an intricate region of a calibration sample obtained according to some implementations of the present disclosure.

The imaging and reconstruction process was repeated on an intricate region of the calibration sample (image 806), showing the capability of cantilever-free atomic force microscopy according to some implementations of the present disclosure. FIG. 8C provides cantilever-free atomic force microscopy images of a complex region of the calibration sample with insets showing an assortment of lines, pits, and mesas. Analysis of the image 806 was performed by exploring the step heights measured by four probes. The measured comparable regions revealed a ~6% variation in step height measured for a single probe and a ~3% variation in the average step height measured by all four probes. These metrics begin to address the question of repeatability in cantilever-free atomic force microscopy, but their modest size in this example study provided in FIGS. 8A and 8B shows that embodiments of the present disclosure can provide reliable measurements of nanoscale structures.

While embodiments of the present disclosure provide evidence that cantilever-free atomic force microscopy can provide high resolution topographical imaging, opportunities and fundamental limitations of can be characterized. For example, one potential benefit is cantilever-free atomic force microscopy can provide more information from each frame than simply providing topography. For instance, initial experiments using atomic force microscopy have found that torques acting on a probe (e.g., the probe 120-1) can lead to asymmetric deformation profiles that enable the measurement of lateral forces. In some implementations, this can allow one to measure the gradient of sample topography, in contrast to cantilever-based atomic force microscopy that are at most only sensitive to lateral forces in one direction.

Furthermore, sizes of the probe array quoted or used in the several examples in the present disclosure are not a fundamental limit. In particular, the maximum probe array size is limited by the optical field-of-view, which can be nearly 0.5 cm for large format sensors with 5× optical magnification. Thus, arrays with 100× larger area should be readily attainable. A large working area and increased throughput that is achieved by cantilever-free atomic force microscopy through parallelization comes at the cost of vertical range. While the largest contrast in height that can be measured will depend upon details of sample topography, the probe height represents an absolute maximum vertical range that can be accommodated without contact between the substrate layer 208 and the sample 150. This limit indicates that vertical range can be increased at the cost of lower throughput by using larger probes that are spaced further apart. Samples that deviate from planarity, such as those with substantial bowing, can present difficultly in measuring using cantilever-free atomic force microscopy, since all probes are subjected to the same vertical range. These difficulties can be alleviated by repeating cantilever-free atomic force microscopy measurements at multiple probe tilt angles in order to capture regions of a bowed surface.

While the experiments for FIGS. 7, 8A, 8B, and 8C were performed on stiff samples, namely silicon wafers (substrate stiffness $E_s$>100 GPa), evaluation of how this technique can perform on samples with different $E_s$ was performed. A series of finite element simulations to compute the deformation of interactions between the compliant film layer 206, the probe 120-1, and the sample 150. In particular, high resolution topographic imaging is possible when the sample and probe deformations are very small compared with the deformation of the compliant layer 206, as the small deformations of the sample and the probe will preserve a small contact area of the probe on the sample. If, on the other hand, one wishes to deform the sample in order to study its nanomechanical properties, a more substantial sample deformation is desired. Following these guidelines, the probes discussed herein are ideal for high resolution topographical imaging when $E_s \geq 1$ GPa and could be useful for nanomechanical studies in the range 10 MPa<$E_s$<1 GPa. Similar to how the stiffness range of cantilever-based probes can be chosen by selecting a probe with the correct spring constant, these ranges can be shifted to higher or lower values of $E_s$ by increasing or decreasing stiffness of the compliant layer 206, respectively.

A driving consideration for parallelization is throughput, thus imaging speed is a consideration. In the experiments of FIGS. 7, 8A, 8B, and 8C, each frame was acquired in 1 s, which indicates that the imaging bandwidth of the system 100 (defined as the number of points in a frame divided by the time to acquire one frame) was over 1 kHz. To provide a frame of reference for this number, the imaging bandwidth of a cantilever-based system is bounded by its mechanical bandwidth, which is approximated by the cantilever resonance frequency divided by cantilever quality factor. For standard cantilever-based probes this can range from ~200 Hz to 1 kHz and is a fundamental limitation of the cantilever. In contrast, the bandwidth of cantilever-free systems can be increased through parallelization and shortening frame acquisition time. As previously discussed, scaling to arrays that are 100× larger can be achieved with no change to the optical system. Due to the simplicity of the optical measurement, the measurement scheme may be reduced to 100 ms or less without specialized optics. With these improvements, MHz bandwidth is attainable. Total imaging time will also be defined by the number of frames in an image and processing time for the software. For instance, the data in the image 806 of FIG. 8C took 256 s to collect and 54 s to process, using the image reconstruction algorithm described in FIG. 7.

Figure 9A:
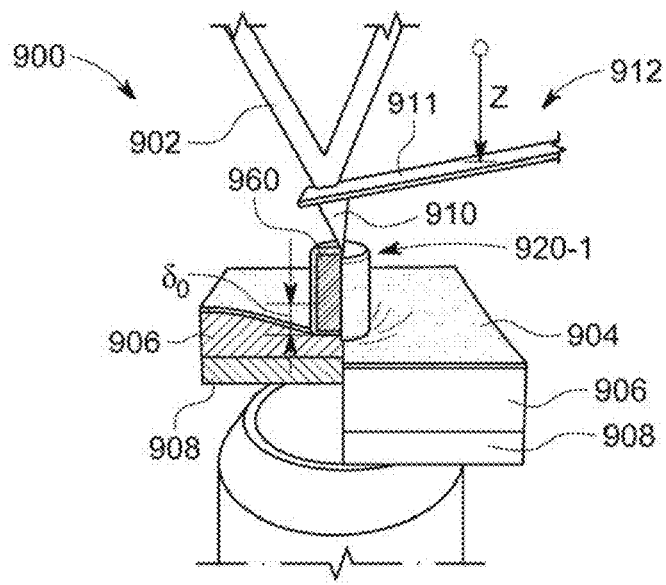
FIG. 9A illustrates an experimental setup for determining mechanical properties of cantilever-free probes modeled as a cylinder, according to some implementation of the present disclosure.

Cantilever-lever free probes designed according to some implementations of the present disclosure exhibit certain properties. The following discussion provides experimental setups and derived properties for cantilever-free probes designed according to some implementations of the present disclosure. FIG. 9A illustrates an experimental setup 900 used to measure mechanics of cantilever-free probes. The setup 900 includes a conventional cantilever probe 912 with a cantilever 911 and a probe tip 910. A laser beam 902 is used to determine deflection z of the cantilever 911. A cantilever-free probe 920-1 is modeled as a cylinder. The cantilever-free probe 920-1 has a reflective film layer 904, a rigid probe material 960, a compliant film layer 906, and a substrate layer 908. The reflective film layer 904, a rigid probe material 960, a compliant film layer 906, and a substrate layer 908 are similar to or same as their counterparts discussed above in connection to FIGS. 2A and 2B.

For the purpose of characterizing the mechanics of cantilever-free probes, a series of experiments were performed to deform cantilever-free probes (e.g., the probe 920-1) using a conventional atomic force microscopy probe (e.g., the probe 912), while observing the conventional atomic force microscopy probe using an inverted microscope. Due to the probes (e.g., the probe 920-1) themselves being much stiffer than the elastomeric substrate (e.g., the compliant film layer 906), the main role of the probe from a mechanical perspective was to determine the contact-area between the probe and the elastomeric support. Thus, as cylindrical and conical probes are expected to behave identically from a mechanical perspective, cylindrical probes were chosen for the sake of facile mechanical testing. Specifically, a cantilever-free array including a series of direct laser writing printed cylinders, 6 µm tall with R ranging from 3 to 8 µm, were provided on a 14 µm thick PDMS film. The probe arrays were made reflective with a 30 nm aluminum coating.

Figure 9B:
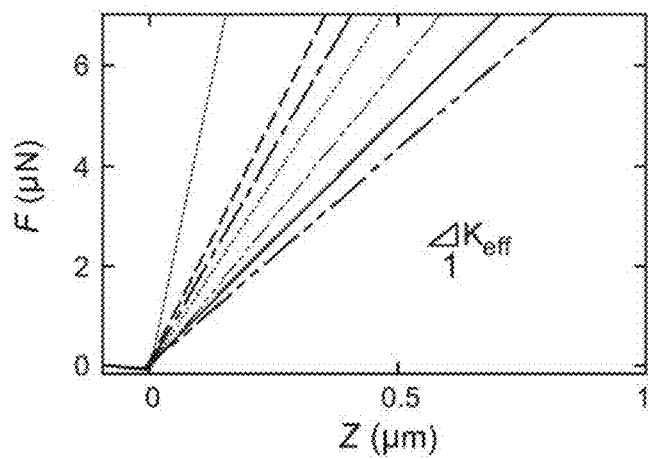
FIG. 9B illustrates force versus displacement curves for different sized cylinders, according to some implementation of the present disclosure.

In order to measure the mechanics of the cantilever-free probes, the probes were placed in a combined inverted microscope system (MFP-3D Bio—Asylum Research). Mechanically, the probe arrays were characterized using a conventional atomic force microscopy probe (NSC16/No Al—MikroMasch). Initially, the probe was characterized by taking a thermal measurement of power spectral density (PSD) of the vibrational resonance of the probe and indenting a rigid surface (i.e., a glass slide) to determine the optical lever sensitivity. Together, these measurements allowed computing the cantilever spring constant $k_c$=47.1±0.3 N/m. Once calibrated, the region corresponding to a single cylinder was imaged as a way of positioning the conventional atomic force microscopy probe on the center of a cantilever-free probe. Subsequently, force-distance curves were performed and found to produce linear responses (FIG. 9B), which allowed computing the effective spring constant $k_{eff}$ of the system as the slope of the force-indentation curve. As the cantilever-free probe and conventional atomic force microscopy probe form two springs in series, the spring constant $k_{cf}$ of the cantilever-free probe can be computed using Eq. 13.

$$k_{cf}=k_{eff} \cdot k_c \cdot (k_{eff}-k_c)^{-1} \tag{Eq. 13}$$

Figure 9C:
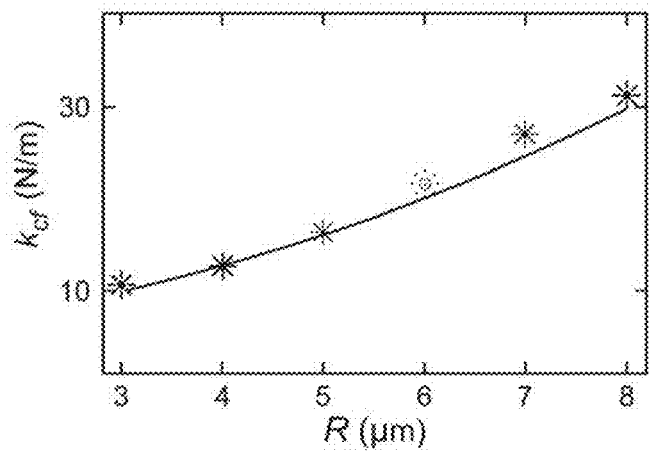
FIG. 9C illustrates corresponding spring constant of the different sized cylinders, according to some implementation of the present disclosure.

The $k_{cf}$ was found to monotonically increase with R from 10.6 N/m to 31.1 N/m (FIG. 9C), in qualitative agreement with Eq. 1. This simple relationship underestimates key as it does not take into account two influential factors, (1) deformation of the comparatively rigid yet nanoscopic aluminum film, and (2) the finite thickness of the elastomer film, which leads to confinement effects in a contact-area dependent manner. By modeling this deformation using the COMSOL Multiphysics® simulation platform (black line in FIG. 9C), which allows one to take these two factors into consideration, good agreement is found with experimental values. Experimental values are shown as individual points while finite element simulations are shown as the black line.

Figure 10A:
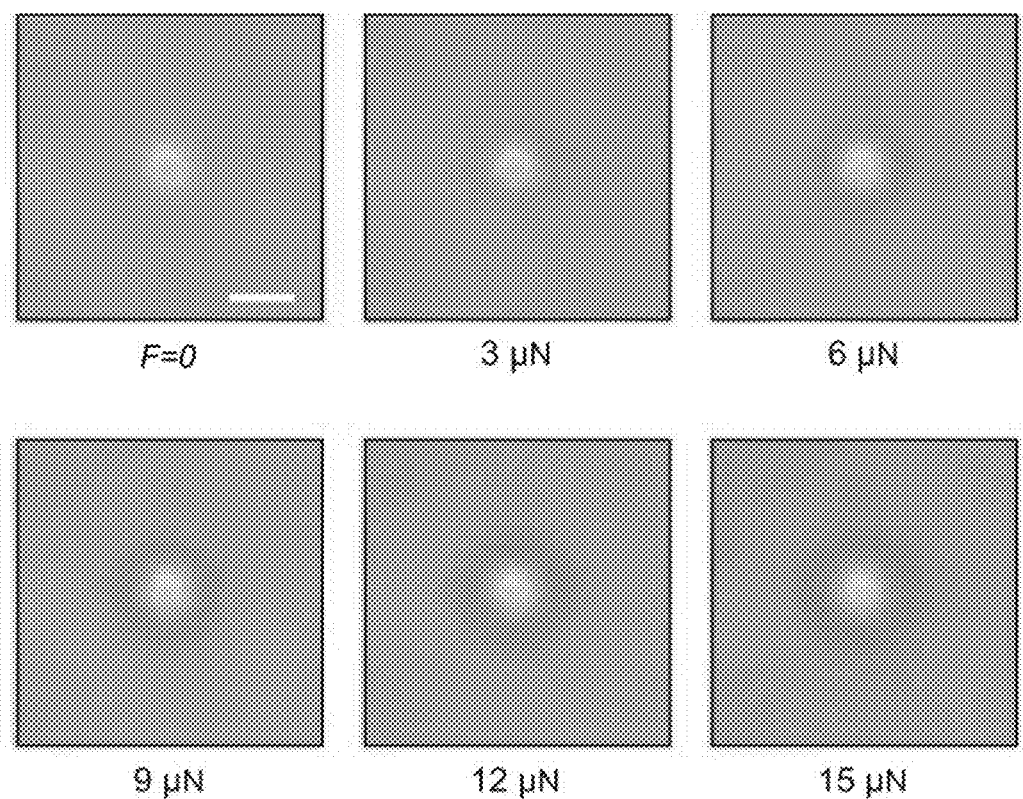
FIG. 10A provides optical images of visible deformation of the probe under increasing forces applied using the experimental setup of FIG. 9A, according to some implementation of the present disclosure.
Figure 10B:
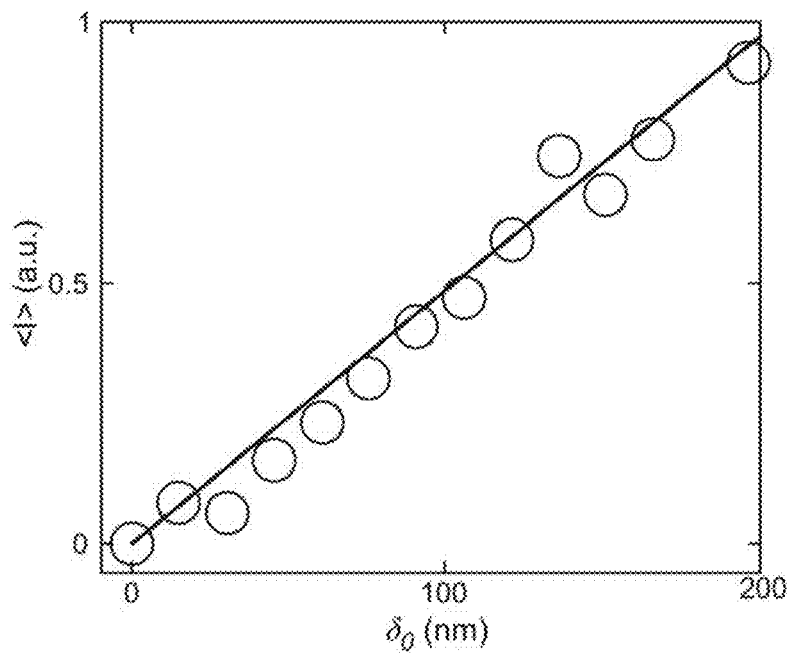
FIG. 10B is a graph of average intensity of optical images from FIG. 10A as a function of indentation, according to some implementation of the present disclosure.

Optomechanics of cantilever-free probes were tested using the experimental setup of FIG. 9A. The experimental setup of FIG. 9A allowed determining degree to which deformation of cantilever-free probes (e.g., the probe 920-1) were optically detectable. Thus, the atomic force microscopy indentation experiments, discussed above with respect to finding spring constants, were repeated while observing the probe array through the sapphire wafer using a bright field optical microscope (Eclipse Ti—Nikon) with a high resolution camera (Point Grey Grasshopper GS3-US-32S4C-C) and 10× Olympus objective. As the force F on the probe increased, there was a drastic and visible change in the brightness in a region surrounding the probe (FIG. 10A). Repeating this measurement with multiple force set points revealed that this darkening increased in a monotonic fashion for $\delta_0 \leq 1.5$ µm. To more quantitatively determine the relationship between the optical signal and the deformation, optical images were taken with fixed 80. An image taken while the conventional atomic force microscopy probe was out of contact was used as a baseline and subtracted from all images. Subsequently, each image was denoised using a low pass filter with a cutoff value at 65% of the maximum value of all the pixels over the region of interest with a diameter of 15 µm centered around the probe and summed to produce an estimate of average intensity (I). In agreement with the distributed optical lever model of FIG. 3F, (I) was found to consistently increase across the whole range (FIG. 10B). The precision with which probe indentation δ can be measured was estimated to be 6 nm by multiplying the slope of the linear fit by the residual standard deviation in the range 0 to 100 nm, leading to the conclusion that this approach can be used to achieve vertical resolutions better than 10 nm.

Figure 11A:
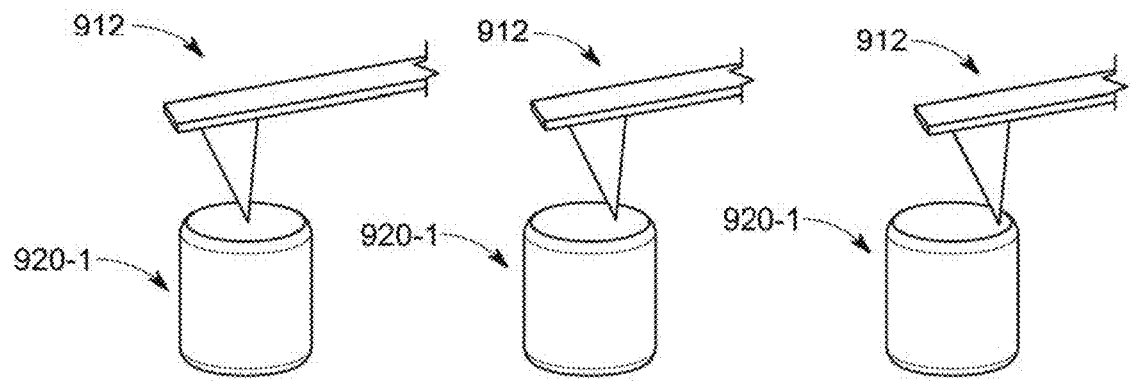
FIG. 11A provides images of applying lateral forces to cantilever-free probes by using an off-center force on the top of the cantilever-free probe, according to some implementation of the present disclosure.
Figure 11B:
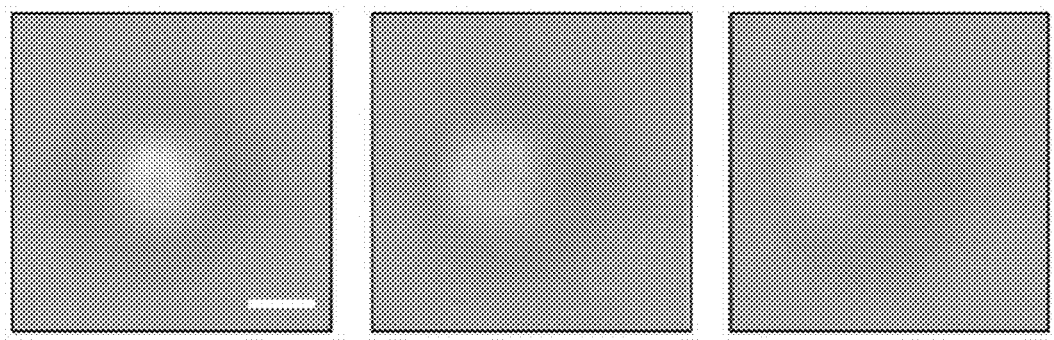
FIG. 11B provides images of anisotropic deformation that corresponds to the lateral forces applied in FIG. 11A.
Figure 11C:
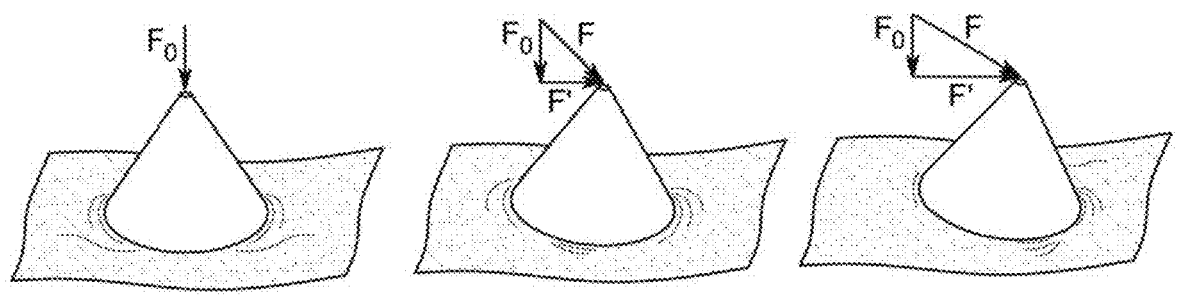
FIG. 11C illustrates lateral forces acting at a tip of conical cantilever-free probes, according to some implementation of the present disclosure.

Lateral forces on cantilever-free probes were observed. Cantilever-free architectures can be useful for other types of imaging beyond what is possible using conventional atomic force microscopy. For example, conventional cantilever-based atomic force microscopy is only sensitive to lateral forces in the direction perpendicular to the cantilever due to the limitations of four quadrant optical lever measurements. Further, due to the comparative stiffness of the torsional mode of typical conventional atomic force microscopy probes, the lateral force is typically neglected except when deliberately scanning laterally in contact mode to measure probe-sample friction using lateral force microscopy. To study whether cantilever-free probes are sensitive to lateral forces, the cantilever-free probe 920-1 that is shaped as a cylinder with R=3 µm was indented at various displacements away from the cantilever-free probe's center point using a conventional probe 912. Analogous to a lateral force acting on the tip of a probe, an off-center normal force will produce a known torque about an axis running along the probe-compliant film layer interface (FIG. 11A). The optical signal detected changed markedly as the probe was moved along the pillar (FIG. 11B). Since a probe imaging a sample that is at an angle will produce a lateral force, the ability to detect lateral forces in two dimensions provides an opportunity to directly measure the gradient of surface topography, a desirable new capability that can enable faster determination of sample topography. In FIG. 11C, torque r=0, 8 and 16 µN·µm, from left to right. In FIG. 11B, scale bar of the middle row is 10 µm.

Probe and sample deformation were studied. As the conical probe itself is composed of a polymeric material, it is conceivable that tip deformation could limit resolution or otherwise interfere with the ability to quantitatively map sample topography. In analogy with conventional cantilever-based atomic force microscopy measurements, one can define the vertical z-piezo motion as ΔZ and the deflection of the compliant layer (or in the case of cantilever-based atomic force microscopy, the deflection of the cantilever) as $\delta_0$. In addition to the compliant layer deformation, the probe tip can deform with magnitude $\delta_p$ in a manner that would reduce the total probe height $h_p$. Further, the sample itself can experience a deformation—or indentation—which can be defined as $\delta_s$. These motions are interrelated by Eq. 14.

$$\Delta Z = \delta_0 + \delta_s + \delta_p \quad \text{(Eq. 14)}$$

In conventional cantilever-based atomic force microscopy, $\delta_p \ll \delta_0$ as cantilevers are generally chosen to be much softer than the tip-sample spring constant. Further, for typical imaging applications, probe stiffness is chosen such that $\delta_s \ll \delta_0$, which simplifies calibration of the probe and facilitates quantitative topographical mapping. In contrast, nanomechanics measurements are often performed with $\delta_s \sim \delta_0$. Such sample deformation is a useful aspect of quantitatively evaluating the mechanics of the underlying sample.

Figure 12A:
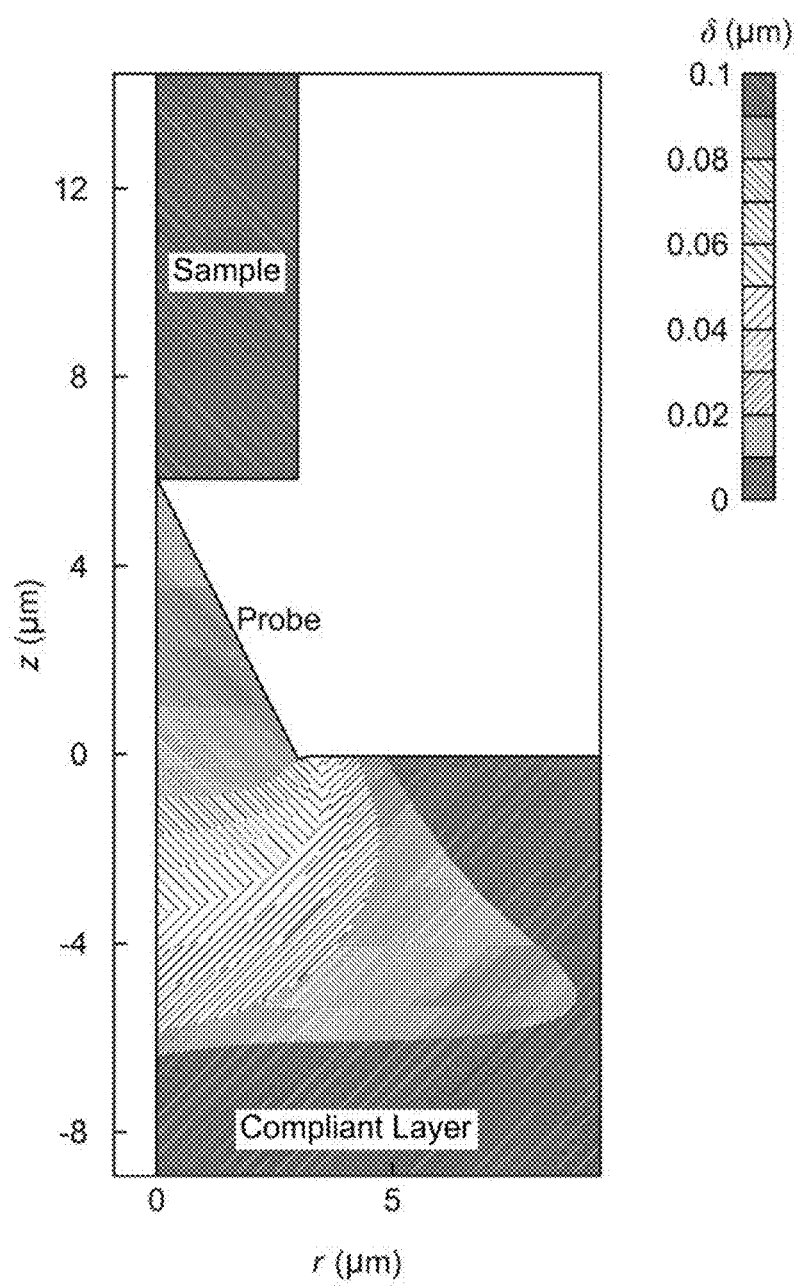
FIG. 12A illustrates finite element simulation of deformation associated with probe-sample contact of a cantilever-free probe and sample, according to some implementation of the present disclosure.
Figure 12B:
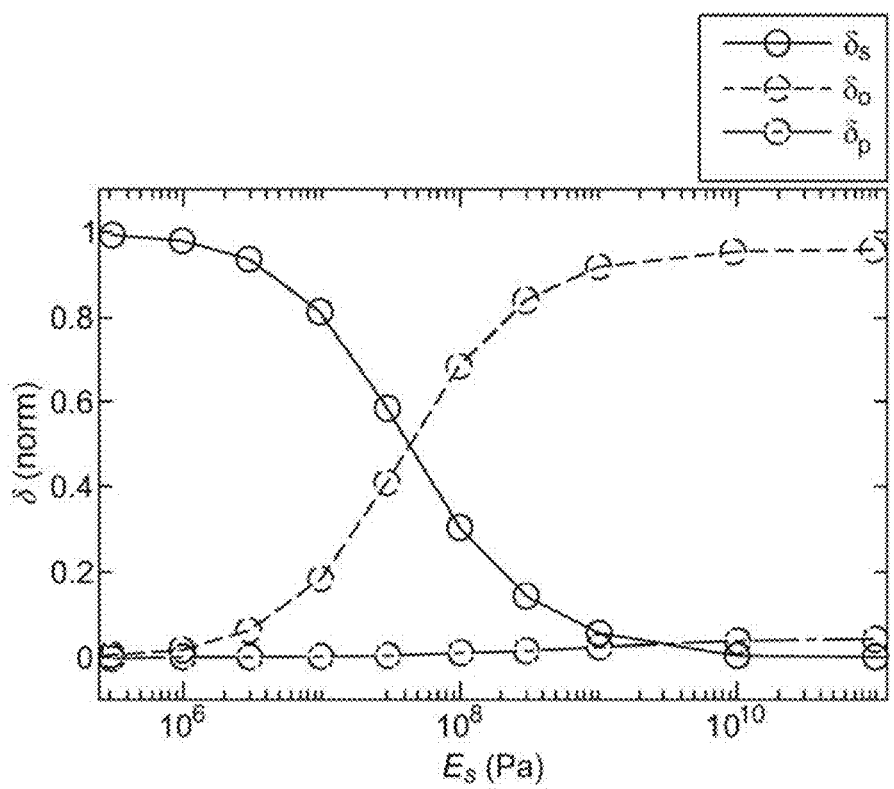
FIG. 12B is a graph showing substrate indentation, compliant layer deformation, and probe compression for a cantilever-free probe indenting a substrate with a stiffness $E_s$, according to some implementation of the present disclosure.

In order to determine the significance of each of these deflections for cantilever-free atomic force microscopy, a series of finite element simulations is performed. For example, an axisymmetric simulation is performed using the COMSOL Multiphysics® platform with design input parameters to match as closely as possible the experimental conditions. A 3 GPa conical probe with tip radius ρ=100 nm, 6 µm height, and 3 µm bottom radius was positioned on a compliant layer with 300 kPa modulus. A sample with modulus $E_s$ was positioned in contact with the probe and then moved ΔZ towards the probe (FIG. 12A). This process allowed computing 8S, $\delta_p$, and $\delta_0$ for a given ΔZ and $E_s$. Exploring ΔZ=100 nm as a typical indentation, the deformation of the sample follows an expected distribution based upon $E_s$ (FIG. 12B and Table 1). Specifically, at $E_s$>1 GPa, nearly all of the deformation is localized in the compliant layer, while when $E_s$<10 MPa, the compliant layer deforms very little and the sample is indented to a great extent. This leads to a conclusion that, for this probe geometry, topographic imaging is possible when $E_s$>10 MPa as this region has a substantial compliant layer deformation. Nanomechanical measurements often require appreciable sample deformation and, thus, nanomechanical experiments should be possible when, for example, 1 GPa>$E_s$>10 MPa.

It can also be valuable to consider how the contact area will change upon contact. These simulations provide an avenue to calculate contact area using the approximation that, in Hertzian contact between a spherical tip and a planar substrate, the contact radius a is given by Eq. 15.

$$a = \sqrt{\rho(\delta_p + \delta_s)} \quad \text{(Eq. 15)}$$

Figure 12C:
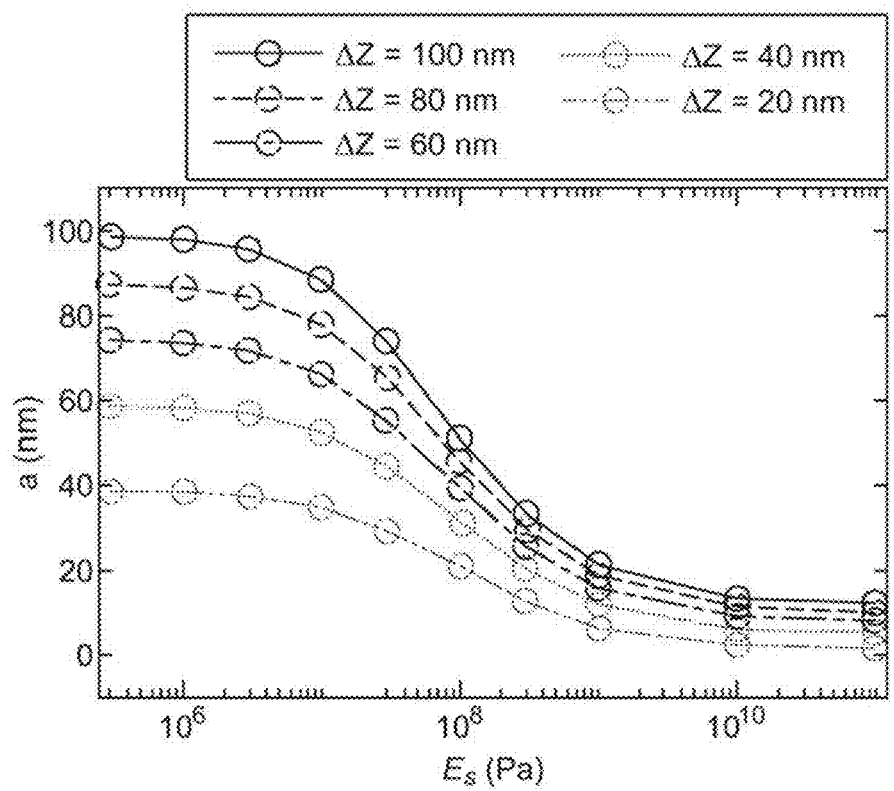
FIG. 12C is a graph showing calculated contact radius as a function of stiffness at different vertical heights, according to some implementation of the present disclosure.

This reflects that, while the maximum $\delta_p$ observed for this range is ~4% of ΔZ, the tip-sample contact area can also be increased through the deformation of the sample. The smallest a is observed at high $E_s$ and low ΔZ, showing that these conditions can be beneficial for high resolution topographical imaging (FIG. 12C).

TABLE 1

Finite element simulation results of mechanics of different sample modulus at z-piezo motion $\Delta Z = 100$ nm tbr a variety of sample moduli.

| Sample modulus $E_s$ | Probe height decrease $\delta_p$ (nm) | Compliant layer deflection $\delta_o$ (nm) | Sample deflection $\delta_s$ (nm) |
| --- | --- | --- | --- |
| 300 kPa | 0.01 | 0.67 | 99.33 |
| 1 MPa | 0.02 | 2.19 | 97.79 |
| 3 MPa | 0.06 | 6.28 | 91.65 |
| 10 MPa | 0.18 | 18.5 | 81.36 |
| 30 MPa | 0.44 | 41.04 | 58.52 |
| 100 MPa | 1.00 | 68.66 | 30.35 |
| 300 MPa | 1.57 | 83.97 | 14.46 |
| 1 GPa | 2.48 | 91.66 | 5.86 |
| 10 GPa | 3.89 | 95.42 | 0.69 |
| 100 GPa | 4.17 | 95.76 | 0.07 |

Figure 13:
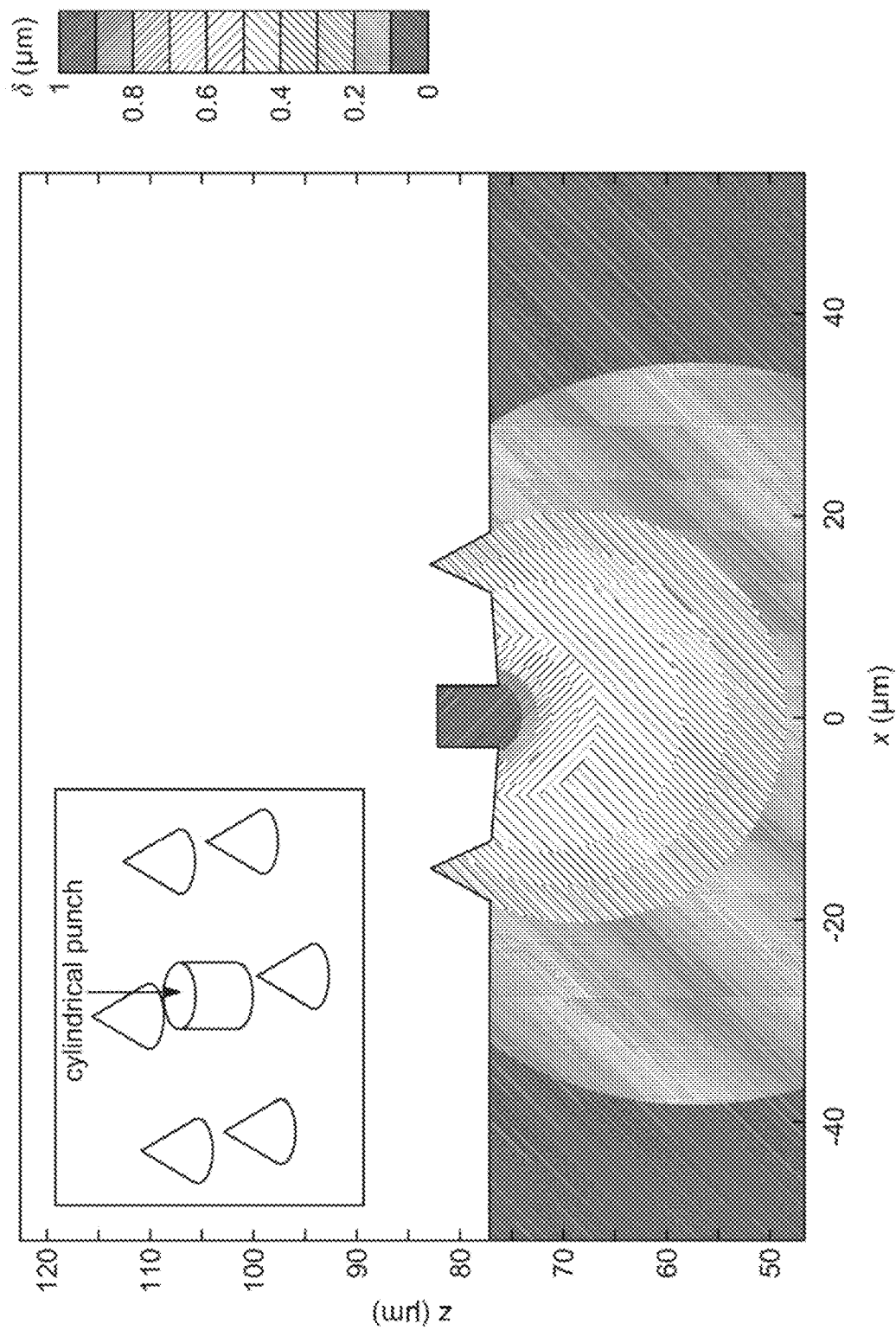
FIG. 13 illustrates finite element simulation of crosstalk by calculating deformation of a seven probe array in which the central probe is modeled by a cylinder and deformed by 1 µm, according to some implementation of the present disclosure.

Crosstalk was estimated with results shown in FIG. 13. Deformation of one probe may lead to the motion of neighboring probes by virtue of the mechanical coupling through the common compliant layer. This effect will lead to imaging artifacts as the sample height registered by a probe will be influenced by the height registered by neighboring probes. In order to explore this effect, a three dimensional finite element simulation (COMSOL Multiphysics® simulation platform) in which a central probe was modeled as a cylinder was performed. A cylinder was chosen such that a displacement boundary condition can be applied without any complications associated with internal deformation of the probe. Six conical probes were arranged in a hexagonal array around the central probe. The base radii of the conical probes and the radius of the central cylinder were all set to 3 µm and the probe-to-probe distance was set to 15 µm to match experimental values. Once set up, a 1 µm downward displacement was applied to the central cylinder and the resulting displacement of the system was computed (FIG. 13). The neighboring probes were observed to move 0.29 µm, providing an estimate for crosstalk. From the calculations, increasing probe-to-probe spacing will decrease crosstalk with near negligible crosstalk at ~30 µm. Thus, while crosstalk can be compensated for using post processing of images, it may also be removed at the cost of reduced sample throughput.

Embodiments of the present disclosure provide a model for a distributed optical lever. Systematic exploration of the model using coordinated force and optical microscopy revealed optical contrast to be linear in both force and deformation. The distributed optical lever is also able to provide sub-10 nm vertical precision. Using probe arrays based on this novel architecture and imaging mechanism, 1,088 probes were used to image and map sample height with 100 nm lateral resolution and 9 nm vertical precision across 0.5 mm. The high throughput nature of the distributed optical lever can be used in fields where both high resolution and large areas are desirable such as integrated circuit metrology, optical metasurface characterization, and multi-scale studies of biological tissue.

Embodiments of the present disclosure provide a method for performing massively parallel atomic force microscopy. A surface of a compliant layer of a probe array is deformed based at least in part on the probe array coming in contact with a surface of a sample. The surface of the compliant layer deforms in proportion to localized height on the surface of the sample. A camera can be used to detect the deformation in the compliant layer.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. Moreover, words of approximation, such as "about," "nearly," "approximately," and the like, can be used herein to mean "at,", "near," or "nearly at," or "within 3-5% of," or "within acceptable manufacturing tolerances," or any logical combination thereof, for example.

While various embodiments of the present technology have been described above, it should be understood that they have been presented by way of example only, and not limitation. Numerous changes to the disclosed embodiments can be made in accordance with the disclosure herein without departing from the spirit or scope. Thus, the breadth and scope of the present invention should not be limited by any of the above described embodiments. Rather, the scope of the invention should be defined in accordance with the following claims and their equivalents.

Furthermore, although the present technology has been illustrated and described with respect to one or more implementations, equivalent alterations and modifications will occur to others skilled in the art upon the reading and understanding of this specification and the annexed drawings. In addition, while a particular feature of the present technology may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A system, comprising:
    a probe assembly, including
        a rigid substrate,
        a compliant layer provided on the rigid substrate,
        one or more rigid probes coupled to at least a portion of a top surface of the compliant layer, and
        a reflective layer covering portions of the top surface of the compliant layer,
    a camera configured to generate image data from the probe assembly;
    a memory storing machine-readable instructions; and
    a control system including one or more processors configured to execute the machine-readable instructions to:
        receive the generated image data; and develop a topographical image of a surface of a sample based at least in part on the received image data generated by the camera.

2. The system of claim 1, wherein the rigid substrate includes sapphire, glass, or quartz.

3. The system of claim 1, wherein the compliant layer includes polydimethylsiloxane or synthetic rubbers.

4. The system of claim 1, wherein the reflective layer includes aluminum, gold, chrome, or titanium.

5. The system of claim 1, wherein the control system is further configured to execute the machine-readable instructions to raster scan the surface of the sample to obtain a plurality of frames, wherein the image data includes the plurality of frames.

6. The system of claim 5, wherein developing the topographical image includes determining field of view images associated with each of the rigid probes in the probe assembly.

7. The system of claim 6, wherein developing the topographical image includes stitching together field of view images associated with each of the rigid probes in the probe assembly.

8. The system of claim 7, wherein overlapping regions in the field of view images are used in aligning the field of view images prior to stitching the field of view images together.

9. The system of claim 6, wherein developing the topographical image includes height correction.

10. The system of claim 6, wherein developing the topographical image include despeckling.

11. The system of claim 6, wherein developing the topographical image includes desharpening.

12. The system of claim 1, wherein the generated image data includes at least one frame indicating locations of the one or more rigid probes as areas with lowest intensity.

13. The system of claim 1, wherein indentation of a first probe in the one or more probes deforms a localized surface of the probe assembly, with maximum deformation occurring closer to the first probe.

14. The system of claim 13, wherein a magnitude of indentation of the first probe is inversely proportional to light intensity around the first probe that is captured by the camera.

15. The system of claim 14, wherein a relationship of the inverse proportionality is linear.

16. The system of claim 1, wherein arrangement of the one or more probes, relative to each other, determines a scan size when the camera generates the image data from the probe assembly.

17. The system of claim 1, wherein the one or more rigid probes are directly coupled to the compliant layer.

18. The system of claim 1, wherein the reflective layer covers all of the top surface of the compliant layer, and the one or more rigid probes are arranged on the reflective layer to cover at least a portion of a top surface of the reflective layer, the one or more rigid probes being indirectly coupled to the compliant layer.

19. A probe assembly for atomic force microscopy, including:
- a rigid substrate;
- a compliant layer provided on the rigid substrate;
- one or more rigid probes coupled to least a portion of a top surface of the compliant layer; and
- a reflective layer covering portions of the top surface of the compliant layer,
- wherein bringing the probe assembly in contact with a top surface of a sample causes the one or more rigid probes to deform the compliant layer, an extent of deformation by each of the one or more rigid probes being proportional to a localized height at the top surface of the sample.

20. The probe assembly of claim 19, wherein the rigid substrate includes sapphire, glass, or quartz.

21. The probe assembly of claim 19, wherein the compliant layer includes polydimethylsiloxane or synthetic rubbers.

22. The probe assembly of claim 19, wherein the reflective layer includes aluminum, gold, chrome, or titanium.

23. The probe assembly of claim 19, wherein the one or more rigid probes are directly coupled to the compliant layer.

24. The probe assembly of claim 19, wherein the reflective layer covers all of the top surface of the compliant layer, and the one or more rigid probes are arranged on the reflective layer to cover at least a portion of a top surface of the reflective layer, the one or more rigid probes being indirectly coupled to the compliant layer.

25. A method for fabricating a probe assembly, comprising:
- spinning a compliant layer on top of a rigid substrate;
- curing the combination of the compliant layer and the rigid substrate;
- providing one or more rigid probes on the compliant layer to cover portions of a top surface of the compliant layer, and
- depositing a reflective layer on the one or more printed rigid probes and uncovered portions of the top surface of the compliant layer.

26. The method of claim 25, wherein the rigid substrate includes sapphire, glass, or quartz.

27. The method of claim 25, wherein the compliant layer includes polydimethylsiloxane or synthetic rubbers.

28. The method of claim 25, wherein the reflective layer includes aluminum, gold, chrome, or titanium.

29. The method of claim 25, the rigid probes have a conical shape, a cylindrical shape, or both.

30. A method for fabricating a probe assembly, comprising:
- spinning a compliant layer on top of a rigid substrate;
- curing the combination of the compliant layer and the rigid substrate;
- depositing a reflective layer on the compliant layer; and
- providing one or more rigid probes on the reflective layer to cover portions of a top surface of the reflective layer.

* * * * *